US012794669B2

(12) United States Patent
Patel

(10) Patent No.: US 12,794,669 B2

(45) Date of Patent: Nov. 10, 2026

(54) SYSTEMS AND METHODS FOR AN AUTHENTICATING, THREADING, NORMALIZING-IV AND AUTO-KEYING (ATNA) CIPHER-MODE

(71) Applicant: ATNA-CIPHER LLC, Sunnyvale, CA (US)

(72) Inventor: Tushar Patel, Sunnyvale, CA (US)

(73) Assignee: ATNA-CIPHER LLC, Sunnyvale, CA (US)

( * ) Notice: Subject to any disclaimer, the term of this patent is extended or adjusted under 35 U.S.C. 154(b) by 121 days.

(21) Appl. No.: 18/832,467

(22) PCT Filed: Feb. 3, 2023

(86) PCT No.: PCT/US2023/012250

§ 371 (c)(1),
(2) Date: Jul. 23, 2024

(87) PCT Pub. No.: WO2023/150248

PCT Pub. Date: Aug. 10, 2023

(65) Prior Publication Data

US 2025/0106003 A1 Mar. 27, 2025

Related U.S. Application Data

(60) Provisional application No. 63/306,223, filed on Feb. 3, 2022.

(51) Int. Cl.

*H04L 9/06* (2006.01)
*H04L 9/08* (2006.01)

(52) U.S. Cl.

CPC .......... *H04L 9/0618* (2013.01); *H04L 9/0822* (2013.01)

(58) Field of Classification Search

CPC ............................ H04L 9/0618; H04L 9/0822
See application file for complete search history.

(56) References Cited

U.S. PATENT DOCUMENTS 5,444,781 A * 8/1995 Lynn .................... H04L 9/0662 380/46

6,907,127 B1 * 6/2005 Kravitz ................ H04L 9/0637 380/45

(Continued)

FOREIGN PATENT DOCUMENTS

KR 100930577 B1 12/2009

OTHER PUBLICATIONS

RFC-4303 IP Encapsulating Security Payload (ESP) (Year: 2005).*

(Continued)

*Primary Examiner* — John B King
*Assistant Examiner* — Alex D Carrasquillo
(74) *Attorney, Agent, or Firm* — Kumar Maheshwari; Mahesh Law Group PC

(57) ABSTRACT

Disclosed is a method for implementing a block cipher that includes generating an initialization vector counter. The method includes generating a key tree based on the initialization vector counter where the key tree includes one or more coeval states and where each of the one or more coeval states represents a time period where the time period of each subsequent coeval state I is nested within the previous coeval states. The key tree further includes the key that is determined for each of the one or more coeval states where each of the one or more coeval states is determined based on a counter. The message further includes encrypting, using the key, blocks of data to be transmitted where the recipient is capable of decrypting the one or more blocks only if they are received during the time period of each of the one or more coeval states.

16 Claims, 20 Drawing Sheets

(56) References Cited

U.S. PATENT DOCUMENTS

| | | | | |
|---|---|---|---|---|
| 8,548,164 | B2 * | 10/2013 | Nourry | H04L 9/065 380/28 |
| 9,990,249 | B2 * | 6/2018 | Durham | H04L 9/0637 |
| 10,560,269 | B2 * | 2/2020 | Johnson | H04L 9/3239 |
| 11,210,664 | B2 * | 12/2021 | Osborn | G06Q 20/3829 |
| 11,784,790 | B2 * | 10/2023 | Aschauer | H04L 9/0662 |
| 11,799,713 | B2 * | 10/2023 | Greene | G06F 16/955 |
| 2010/0303229 | A1 * | 12/2010 | Unruh | H04L 9/0637 380/28 |
| 2014/0355754 | A1 | 12/2014 | Leung et al. | |
| 2018/0165225 | A1 * | 6/2018 | Horne | G06F 12/0895 |
| 2018/0183582 | A1 | 6/2018 | Straub et al. | |
| 2020/0084222 | A1 * | 3/2020 | William | H04L 63/12 |
| 2022/0021930 | A1 | 1/2022 | Fahrny et al. | |

OTHER PUBLICATIONS

Aly Mohamed El-Semary et al., "Counter Chain: A New Block Cipher Mode of Operation," Journal of Information Processing Systems, vol. 11, No. 2, Jun. 2015, pp. 266-279.

International Search Report and Written Opinion received in PCT/US2023/012250 dated Jun. 22, 2023, p. 7.

* cited by examiner

SYSTEMS AND METHODS FOR AN AUTHENTICATING, THREADING, NORMALIZING-IV AND AUTO-KEYING (ATNA) CIPHER-MODE

CROSS REFERENCE TO PRIOR APPLICATION

This application is a National Stage application of the International Application No. PCT/US2023/012250, entitled "SYSTEMS AND METHODS FOR AN AUTHENTICATING, THREADING, NORMALIZING-IV AND AUTO-KEYING (ATNA) CIPHER-MODE", filed Feb. 3, 2023, which claims the benefit of U.S. Provisional Patent Application No. 63/306,223, entitled as "SYSTEMS AND METHODS FOR AN AUTHENTICATING, THREADING, NORMALIZING-IV AND AUTO-KEYING (ATNA) CIPHER-MODE", filed Feb. 3, 2022, which are incorporated by reference in their entirety.

FIELD OF THE INVENTION

This disclosure relates to the field of cryptography that facilitates the secure transfer of data between electronic devices or the secure storage of data on devices or mediums.

BACKGROUND

Block ciphers are widely used to secure data. A block cipher breaks data up into portions of a set number of bits representing the block size. The AES standard block cipher, which is the most widely used block cipher, encrypts data in blocks of 128 bits or 16 bytes. A key is used to encrypt data in AES ciphers. Symmetric ciphers, such as AES, use the same key, which was used to encrypt the data, and for subsequent decryption.

Most quantities of data need to be encrypted into multiple blocks because of the relatively small 128-bit block size. For security, each block may have a different key. There are many ways in which multiple keys may be generated. In one method called chaining, an initialization vector is exchanged between a first entity and a second entity. A first key, for the first block is calculated, by the first entity and the second entity, based on the initialization vector. The second key, for the second block of data, is determined based on the first key. Thus, every key is based off the previous key and the first key is determined from the initialization vector.

Drawbacks of chaining are that a large number of keys must be determined beginning from the initialization vector for large sets of data. For instance, where a data transfer is started midway through a set of data, a large number of keys may need to be calculated in order to determine the key to begin the transfer.

Authentication may be performed using message authentication codes (MACs), which may be placed at the start (preamble) or end (prolog) of a data payload. The MACs are shared between the first entity and the second entity during an initial exchange. Then the MACs may be verified to authenticate the identity of a sender or first entity that encrypted the data. However, MACs are limited in that they only authenticate the identity of the first entity. They do not provide information about the encrypted data such as whether the data is authorized to be sent.

There is a need in the art for a better block cipher that improves upon deficiencies in chaining and MACs and improves overall systems and methods of a block cipher.

SUMMARY

A system and method for implementing a block cipher mode is disclosed. A method for implementing a block cipher between a first (encrypting) entity, a second entity, or a group of entities includes generating, by the first entity, the second entity, or any group member an initialization vector counter. The method includes generating by the first entity, the second entity or the group entities, a key tree based on the initialization vector counter where the key tree includes one or more coeval states and where each of the one or more coeval states represents a time period where the time period of each subsequent coeval state is nested within the previous coeval states. The key tree further includes the key that is determined for each of the one or more coeval states where each of the one or more coeval states is determined based on a counter. The message further includes encrypting, by one of the entities using the key, one or more blocks of data to be transmitted to the second entity, other group or subsets of group entities, where the other entities are capable of decrypting the one or more blocks only if they are received during the time period or coeval associative counter state period of each of the one or more coeval states. The method may further include generating, by the encrypting entity, an integrity tag that includes a fast drop tag and a key confirming message authentication code (KCM). The fast drop tag may include data based on each of the coeval states where the other entities are capable of determining each of the coeval states based on the fast drop tag. The other entities may include more than one core where the fast drop tag further comprises a core designation that specifies a core to process a block of data. The core designation may be capable of designating two or more cores to process data from a single packet of the data. The encrypting may include an AES encryption algorithm. The method may further include continuously testing keys for each time period of one or more of the coeval states by sorting the keys and dropping duplicate keys based on the sorting. The KCM may be configured to confirm both an integrity key and an encryption key. The method may further include generating a per-message service ID that is capable of validating the initialization vector counter. The integrity tag may include one or more padding bits that are not transmitted to the other entities. Each subsequent timing or associative counter state is an integral subdivision of the previous timing or associative counter state. The initialization vector counter may be determined based on a request time or associative counter state from an initiator and a response time from a responder.

Another general aspect is a system for implementing a block cipher between a first entity and a second entity, group or subset of group. The system includes a processor coupled to a memory for the first entity. The processor is configured to generate an initialization vector counter responsive to a connection with the other entities). The processor is further configured to generate a key based on the initialization vector counter. The key includes one or more coeval states where each of the one or more coeval states represents a time period where the time period of each subsequent coeval state is nested within the previous coeval states. The key includes a key that is determined for each of the one or more coeval states and each of the one or more coeval states is determined based on counter max values. The processor is further configured to encrypt, using the key, one or more blocks of data to be transmitted to the other entities) where the other entities) are limited to decrypting the one or more blocks only if one or more blocks are received during the same coeval period or grace period of the same coeval period of the first entity. The processor may be further configured to generate an integrity tag that includes a fast drop tag and a message authentication code. The fast drop tag may include data based on each of the coeval states where the second entity is capable of determining each of the coeval states based on the fast drop tag. The integrity tag may include a core designation that specifies a core to process a block of data. The core designation may be capable of designating two or more cores to process data from a single packet of the data. The processor may be configured to encrypt using an AES encryption algorithm. The integrity tag may include one or more padding bits that are not transmitted to the second entity. Each subsequent timing period state may be an integral subdivision of the previous timing period state. The initialization vector counter may be determined based on a request time from an initiator and a response time from a responder.

An exemplary embodiment is a computer readable storage medium having data stored therein representing a software executable by a processor, the software comprising instructions that, when executed, cause the processor to perform generating an initialization vector counter responsive to a connection with the second entity and generating a key based on the initialization vector counter. The key includes one or more coeval states, wherein each of the one or more coeval states represents a time period where the time period of each subsequent coeval state is nested within the previous coeval state and a key that is determined for each of the one or more t coeval states where each of the one or more coeval states is determined based on a counter. The software instructions further cause the processor to perform encrypting one or more blocks of data to be transmitted to a computer network, the computer network is capable of decrypting the one or more blocks only if they are received during the time period of each of the one or more coeval states. The fast drop tag may include data based on each of the coeval states where the computer network is capable of determining each of the coeval states based on the fast drop tag and the integrity tag comprises one or more padding bits that are not transmitted to the second entity.

DETAILED DESCRIPTION

Figure 1:
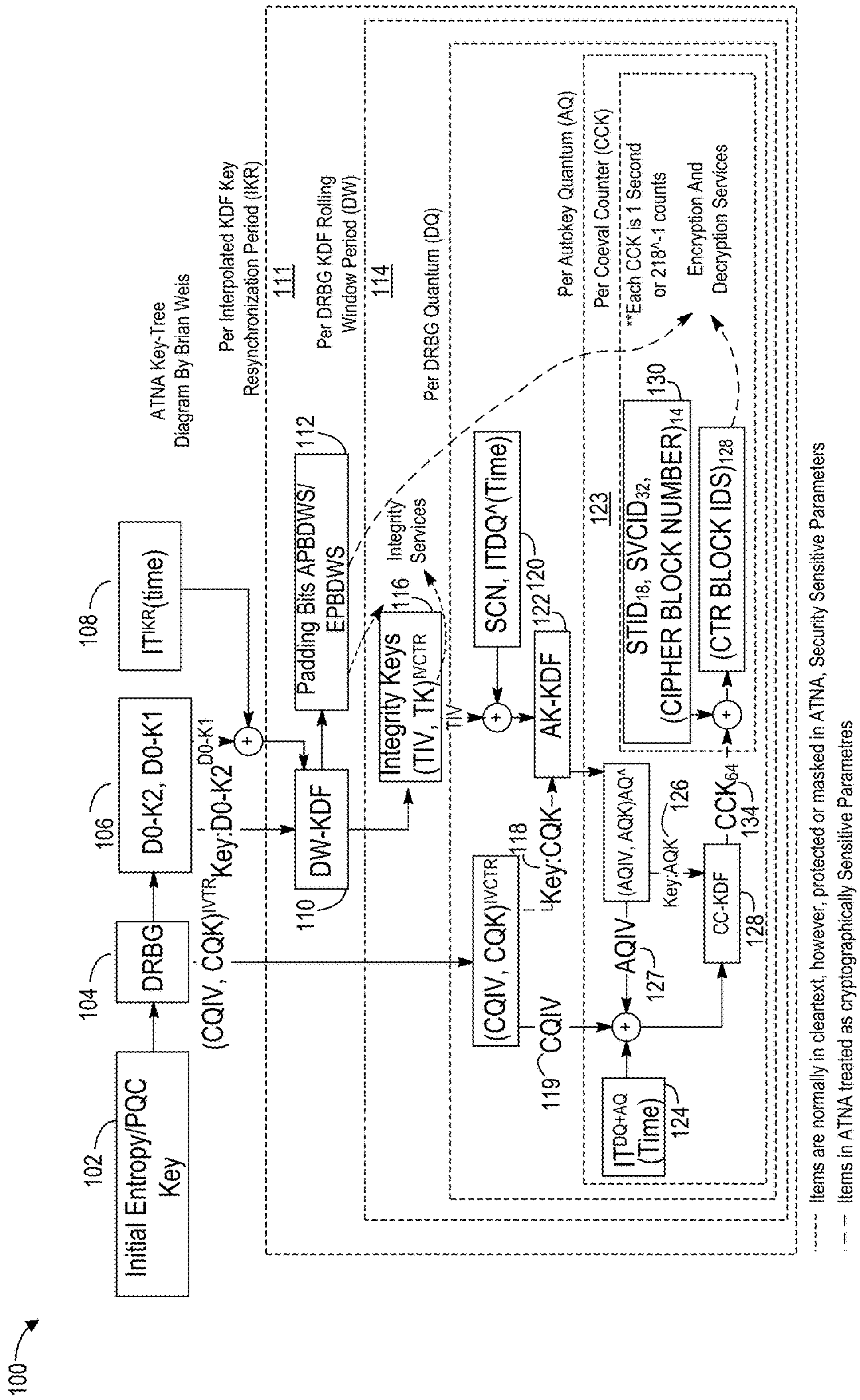
FIG. 1 is a schematic diagram of a system and method for implementing an authenticating, threading, normalizing-IV, and auto-keying (ATNA) cipher.

The disclosed subject matter is a block cipher mode for providing integrity and ciphering (i.e., encryption/decryption) services and networking security. The disclosed block cipher mode may be implemented with various encryption including AES encryption which operates by encrypting/decrypting data and 16-byte (128) blocks. However, the disclosed block cipher is agnostic as to which type of encryption algorithm is used to encrypt data. In an exemplary embodiment data may be encrypted using a DES algorithm.

The disclosed subject matter includes various innovations that improve upon current encryption systems. The disclosed block cipher includes coeval states that, when implemented, limit keys to use during a coeval period. Multiple coeval states may be operating simultaneously. A key may be rejected unless the key is used during the time periods defined by each of the coeval states. In an exemplary embodiment, coeval states may be nested inside one another. This method defines a new form of authenticated encryption, namely, "Coeval Authenticated Encryption" (CAE) that takes two forms, namely, Time-Period based Coeval whereby the state propagates forward based on configure time-periods or Counter Based Coevals whereby the state propagates forward based on hitting maximum counter values.

In an exemplary embodiment, each coeval state comprises time or counter periods that may be determined based on an exchange between a first entity and a second or other entit(y/ies). In various embodiments, a coeval state is determined by an initialization time based on an exchange between the first entity and the other entity. For instance, the initialization time may be based on a time that the first entity sends a connection request and a time that the other entity sends a connection response. Keys for all coeval states may be determined by the initialization time. Accordingly, time periods for each of the coeval states are also determined based on an initialization time.

In an exemplary embodiment, the integrity and ciphering bit streams for the coeval are determined by the used of an approved deterministic random bit generator (DRBG). Thus, a specific coeval period, the state may be calculated directly without calculating all the time periods leading up to the specific time period. For instance, a tenth time period for a coeval state may be directly calculated without first calculating the first through ninth time periods.

Multiple concurrent coeval states may be each determined by separate key derivation functions (KDF) anchored at a common synchronization point namely, the Interpolated Key Resynchronization (IKR) point be it time or counter. Hence KDFs may determine a key and coeval period for a coeval state based on a DRBG and the initialization time.

Another innovation of the disclosed subject matter is an improved message authentication code (MAC). The approved MAC, which may be referred to as "STNMAC", may indicate a core designated to process a portion of data. In an exemplary embodiment, the STNMAC may determine a number of cores based on a payload size of data to be encrypted or decrypted.

Another innovation of the disclosed subject matter is a fast drop tag (FDT) which may be included in the integrity tag. The fast drop tag may allow a quick look up of various coeval states before a data payload is completely decrypted. Thus, a transmission without the correct coeval states may be quickly dropped with minimal processing and is extremely important in preventing disruptive bot style attacks. The fast drop tag may include various other information to facilitate flow control in an ATNA secured network. In an exemplary embodiment, the fast drop tag may define ingress and/or egress parameters. For instance, ingress/egress compliance may be enforced where all entities are authorized to be connected to a network. For example, an entity may be restricted from transmitting specific data which will be dropped by a fast drop tag in egress compliance.

Another innovation in the disclosed subject matter is virtual halo padding whereby padding bits are generated on both sides of an authenticated data tag. The virtual padding bits may be used for integrity calculations, but not transmitted.

Referring to FIG. 1, FIG. 1 is a schematic diagram 100 of a system and method for implementing an authenticating, threading, normalizing-IV, and auto-keying (ATNA) cipher. The ATNA cipher may be used to encrypt and transmit data securely. The ATNA cipher introduces multiple innovations to contemporary cryptography. For instance, the ATNA cipher does not include a traditional initialization vector (IV) to calculate keys for a connection. Instead, an embodiment of the ATNA cipher may be instantiated by an initial key 102 or a post-quantum cryptography key (PQC). The initial key 102 is exchanged between entities and a connection.

Using the initial key 102, a deterministic random bit generator (DRBG) 104 may be used to generate a multitude of keys for the ATNA cipher. Keys generated by the DRBG 104 may be referred to herein as the coeval quantum initialization vector or coevolved quantum key (CQIV and/or CQK). This may also be referred to as $DRBG_{IVCTR}$. The DRBG 104 may be an approved security function comprising 3 methods, a Hash, a keyed-hash message authentication code (HMAC), and a counter (CTR) with a currently approved AES cipher. In various embodiments, the DRBG 104 may deterministically generate random keys with a counter whereby the DRBG 104 may return any value for the counter up to $2^{44}$.

The values D0-K1 and D0-K2 refer to the initial bits of a DRBG stream. They may be referred to as the first and second read Singletons or DRBG anchor 106. An initialization time ($IT^{IKR}$) 108 may be XOR'd with the D0-K1 value and then processed by a key derivation function to determine a DRBG rolling window period (DW) 110. The DW 110 is an incremental set of time periods, where each time period is referred to as a DRBG quantum (DQ) 114. The DW 110 set is an integral division of a base period referred to as a resynchronization period 111. Padding bits 112, which are used for encryption and decryption, may be generated for each DW 110 set. The padding bits may be referred to herein as APBDWS and EPBDWS. APBDWS are padding bits applied to authenticating data which may be referred to as ACD data. EPBDWS are padding bits applied to unencrypted data and are used when the length of the unencrypted data is less than a cipher block size.

Each DQ 114 may be associated with an integrity key 116 that is calculated by the DW-KDF which may be referred to as the tortoise KDF. The subscript IVCTR used in the drawings indicates that these are values determined by the DRBG counter. The integrity keys 116 may be referred to herein as TIV and TK which stands for tortoise key derivation function. Each DQ 114 and its associated integrity key 116 is associated with a time period within which the integrity key will operate.

In the exemplary embodiment shown in FIG. 1, the ATNA cipher includes two additional key derivation functions which are sequentially nested within the DQ. The first key derivation function is the auto-key KDF or AK-KDF 122, which is also referred to as the hare KDF. The auto-key KDF determines a time or counter period that is an integral division of the DQ time period. From the coeval state determined by the auto-key KDF, the coeval counter KDF 128, which is also referred to as the cheetah KDF, determines a time period that is an integral division of the auto-key time period. Each of the sequentially nested KDF's, the tortoise KDF, hare KDF, and cheetah KDF's, have separate rolling keys associated with it.

The disclosed subject matter may be configured to operate with any number of KDF's. In the exemplary embodiment shown in FIG. 1, the AK-KDF 122 takes a coeval quantum key 118 as input and an XOR of the integrity key 116 and a two tuple DRBG quantum time (ITDQ^(Time) and starting core number (SCN) referred to as (SCN, ITDQ^(Time) 120).

The AK-KDF 122 determines a time period for the autokey quantum (AQ) 123. Each AQ 123 will output a key AQK 126 and auto-key quantum initialization vector 127. The coeval counter KDF 128 takes as input and XOR of the auto-key quantum initialization vector 127, a coeval quantum initialization vector 119, and an initialization time 124 for the AQ 123. The coeval counter KDF 128 generates a coeval counter-block period (CCK) 134, which is a time period to process blocks of code. In an exemplary embodiment, the CCK 134 is set to a constant one second, which should be capable of processing 1 million packets per second. Each block is processed with a CCK, a starting thread ID (STID), which may include a number of threads, cores, and processors. Further, each block is processed with a service ID (SVC-ID) 130 that is specific to each message and a BLOCKID (BLKID) that is specific to each block.

Figure 2:
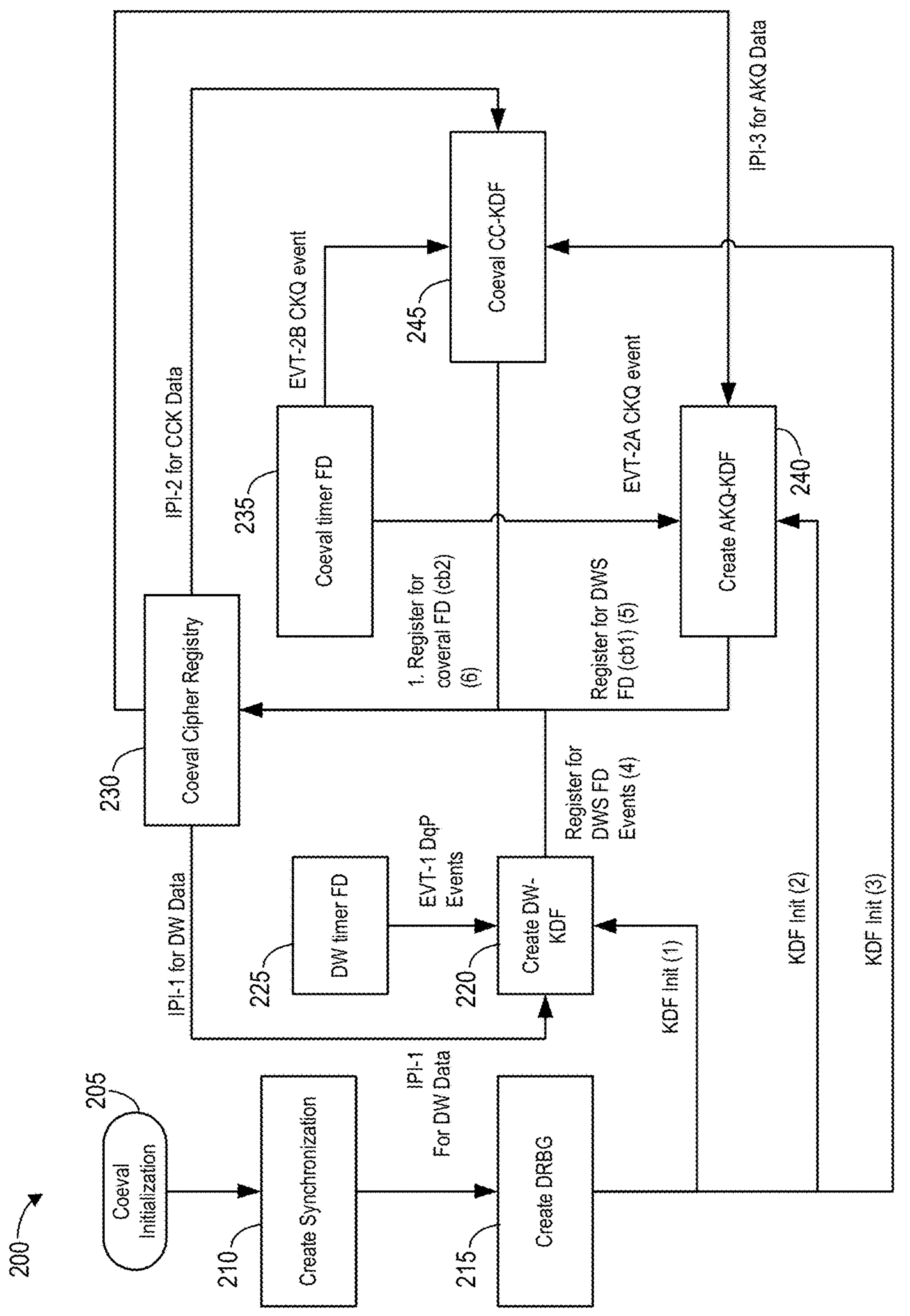
FIG. 2 is a schematic diagram illustrating an embodiment of a method implementing a coeval system in an ATNA cipher.

Referring to FIG. 2, FIG. 2 is a schematic diagram 200 illustrating an embodiment of a method implementing a coeval system in an ATNA cipher. In the embodiment shown in FIG. 2, the ATNA cipher begins with coeval initialization 205 where two or more entities connect to exchange data. Next, the two or more entities create a synchronization 210 whereby they exchange information to generate an initialization key. In an exemplary embodiment, the initialization key is determined based on the time that a request is sent and the time the request is accepted, which is referred to herein as an initialization time. The synchronization 210 may be executed with various exchange protocols such as Crystals Kyber or Diffie-Hellman.

A DRBG 215 processes the initialization time to generate a multitude of key derivation functions, each of which produces a key that defines a period. At step 220, a DW-KDF is initialized based on a time signal sent by a DW timer 225. The DW-KDF generates a set of dw-time periods, within which time periods generated by the other two key derivation functions will be nested. In the exemplary embodiment shown in FIG. 2, the DW-KDF registers an output with a coeval cipher registry 230. The coeval cipher registry 230 provides data from the DW-KDF to the auto-key quantum KDF (AK-KDF), which is initialized at step 240. Likewise, the AK-KDF registers data including key and time period with a coeval cipher registry 230. Time periods generated by the AK-KDF are integral divisions of time periods generated by the DW-KDF.

The coeval counter KDF is generated at step 245 and takes input from the coeval cipher registry 230 and coeval timer FD 235. Time periods generated by the coeval counter KDF are integral divisions of time periods generated by the AK-KDF.

Figure 3:
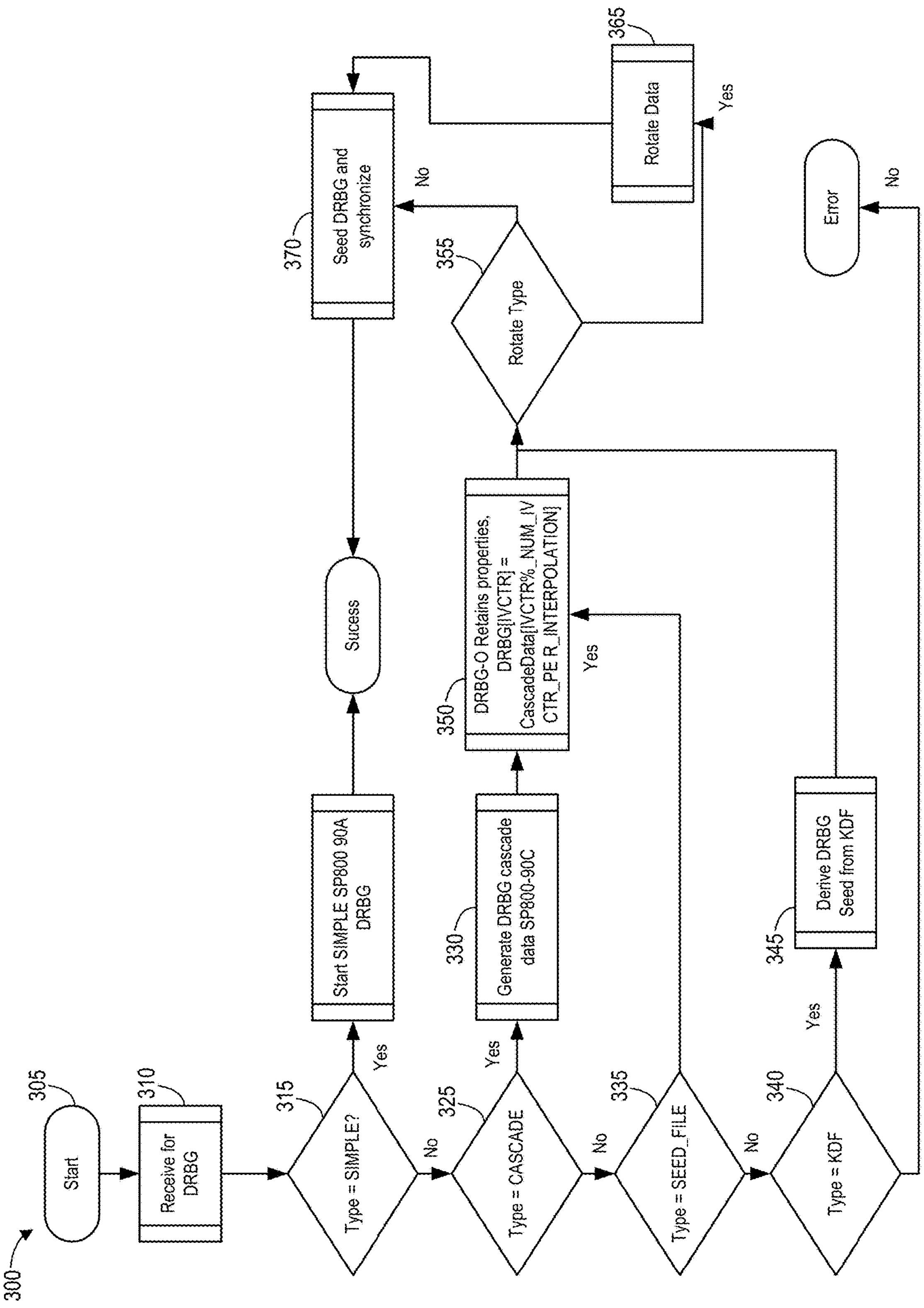
FIG. 3 is a flow diagram illustrating an embodiment of a DRBG sub-sequencer for entities to re-sync in an ATNA cipher.

Referring to FIG. 3, FIG. 3 is a flow diagram 300 illustrating an embodiment of a DRBG sub-sequencer for entities to re-sync in an ATNA cipher. Occasionally entities need to be re-synchronized to complete a transfer. FIG. 3 shows 4 options for re-synchronizing entities, which correspond to 4 separate DRBG types. In an exemplary embodiment, an ATNA cipher may be started at step 305 whereby a request to receive DRBG is made 310. If the SIMPLE type is selected at step 315, the system may iterate through all DRBG counts consistent with the SP800 90A standard. However, the SIMPLE type may be impractical if the DRBG count is high.

For that reason, the sub-sequencer interpolates over the full $2^{44}$ DRBG cycle allowing systems to (re)synchronize at the sub-interpolations to these interpolations providing time-based or counter depth based service guarantees to achieve connection synchronicity or re-synchronicity. (Note informational and no need to add to patent filing, with the latest set of design updates, the Coeval Key Tree is much more flexible in providing these service guarantees and need not mention specific time frames.)

Additionally, if the DRBG KDF is selected 340, a sub-sequencer KDF may be implemented to generate the interpolated seed values at step 345. At step 355, the system may determine whether to rotate types. For instance, if an interpolation seed file is generated, the system may rotate types to SEED_FILE, whereby the system will rotate data at step 365.

Figure 4:
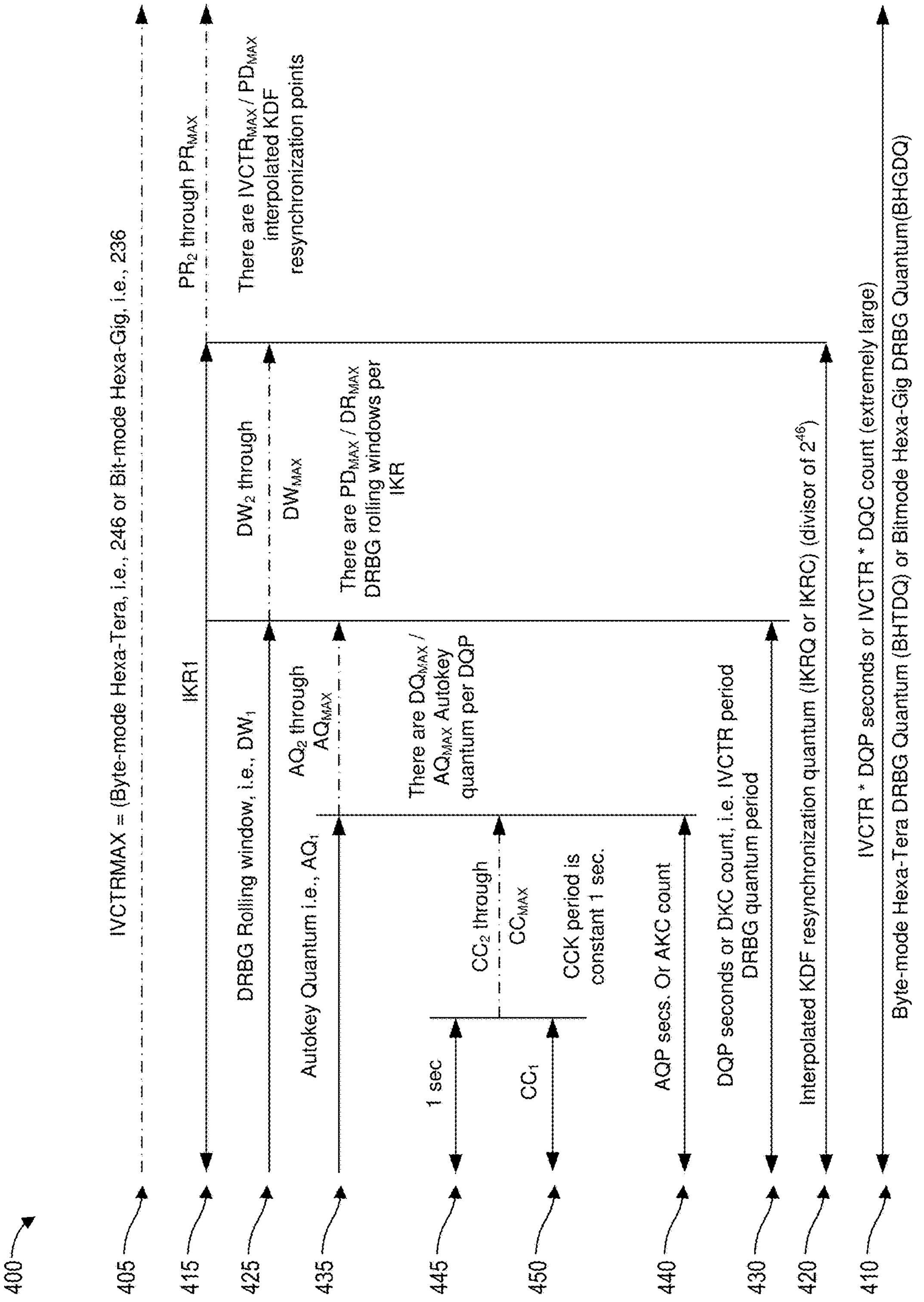
FIG. 4 is a schematic diagram illustrating an embodiment for implementing coeval states in an ATNA cipher.

Referring to FIG. 4, FIG. 4 is a schematic diagram 400 illustrating an embodiment for implementing coeval states in an ATNA cipher. The diagram 400, which is approximately drawn to a logarithmic scale, illustrates the relative time periods or quanta that are used by the ATNA cipher. The IVCTRMAX 405 value represents the total time that the ATNA cipher takes to complete a project. It is equal to byte-mode Hexa-Tera DRBG Quantum (BHTDQ) or Bit-mode Hexa-Gig DRBG Quantum (BHGDQ) 410, and is equal to the initialization vector counter multiplied by the DRBG quantum period in seconds.

The ATNA cipher generates nested time periods that are integral divisions of a larger time period. For instance the interpolated KDF resynchronization periods 415 comprise an integer number of periods that equal the size of IVCTR-MAX 405. Each interpolated KDF resynchronization period 415 is equal to an Interpolated KDF resynchronization quantum (IKRQ or IKRC) 420. The interpolated KDF resynchronization periods 415 may be represented by $PR_n$ where n is equal to a count for the interpolated KDF resynchronization period 415, i.e., $PR_1$, $PR_2$, . . . , $PR_{max}$.

Down one level from the interpolated KDF resynchronization periods 415 is the DRBG Rolling window 425. The DRBG Rolling window 425 defines a time period that is an integral division of the interpolated KDF resynchronization period 415. A complete set of DRBG Rolling windows 425 is equal to the time of an interpolated KDF resynchronization period 415. Each individual DRBG Rolling window 425 may be represented by $DW_n$ where n is equal to a counter for the DRBG Rolling window 425. For instance, the $1^{st}$ DRBG Rolling window 425 is represented by $DW_1$, the $2^{nd}$ by $DW_2$, and so on. The DRBG Rolling window 425 may be referred to herein as a multiple of the DQ, IVCTR period, DRBG quantum period, and DQ 430.

The Autokey Quantum Period (AQ) 435 is an integral division of the DQP. Each AQ period 435 may be labeled $AQ_n$ where n represents a count for the quantum period. The entire set of AQ periods is equal to one DQP window, and also equal to Autokey Quantum Period seconds or AKC count 440.

Finally at the lowest level is the coeval counter-block period 445. Each coeval counter-block period in a set from $CC_1$ through $CC_{max}$ is equal to a time of one AQ. In an exemplary embodiment, the ATNA cipher sets each coeval counter-block period 445 to a constant of 1 second. Each coeval counter-block period may also be labeled CCK.

Figure 5:
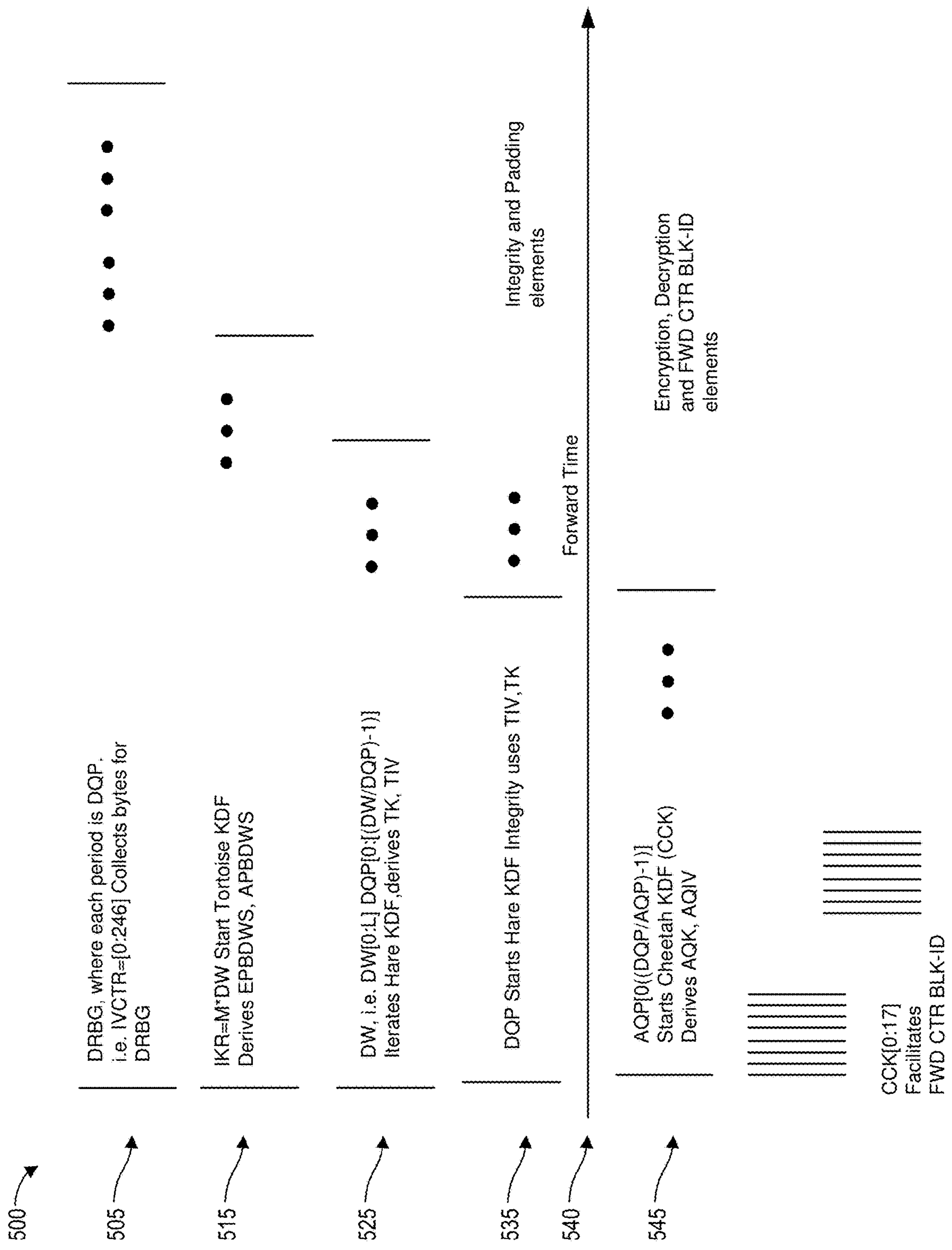
FIG. 5 is a schematic diagram illustrating a method for implementing a set of KDF's.

Referring to FIG. 5, FIG. 5 is a schematic diagram 500 illustrating a method for implementing a set of KDF's. As shown in FIG. 4, the ATNA cipher generates nested time periods that run concurrently. The diagram 500 in FIG. 5 shows an embodiment of a timing method with which the various key derivation functions are implemented. As disclosed above, an ATNA cipher may refer to the various key derivation functions as tortoise, hare, and cheetah. The tortoise, hare, and cheetah key derivation functions generate time periods and keys for each of the time periods.

The ATNA cipher discloses a system whereby keys are linked to a time window. Further, there are multiple concurrent time windows, each of which has a key associated with it. The ATNA cipher generates the time windows as needed. When one time window ends, the next one begins as a counter. The longest-running time window generator generates windows within which the other time windows are nested inside, is the DRBG service 505. Each period of the DRBG service 505 is referred to as the DRBG quantum period or DQP.

As shown by the dotted portions in line with the DRBG service 505, the DRBG service 505 generates integrity elements for every DQP. The Interpolated KDF Resynchronization service 515 starts the Tortoise KDF on a timescale that is an integer division of the time for each DQP. The Tortoise KDF derives padding bits labeled as EPBDWS and APBDWS during the first iteration DW/DQ KDF. The EPBDWS, standing for Encryption Padding Bits at DRBG Windows, padding bits are applied to unencrypted data. The APBDWS, which stands for ACD Padding Bits at DRBG Windows, padding bits apply to authenticating data. The EPBDWS padding bits are derived at the start of each DRBG rolling Window period. The EPBDWS padding bits stay constant for the whole coeval period.

The DRBG rolling Window Service 525 has a time period of the DQP 535 and implements the Hare KDF. The DRBG rolling Window Service 525 derives the 2 tuple (TK, TIV)

key and IV. The Hare KDF uses the 2 tuple (TK, TIV) key and IV for fast drop tag (FDT) processes. The TIV is 16 bytes, and the TK is 32 bytes when using AES-256. The FDT is a representative of this state and a directed map lookup for this state.

As shown in the figure, the DRBG service 505, Interpolated KDF Resynchronization service 515, the DRBG rolling Window Service 525, and DQP generate integrity and padding elements. The services below the dividing line 540 serve to implement encryption, decryption, and forward counter elements.

The auto-key quantum period (AQP) 545 is an integral subdivision of the DQP 535 and starts the cheetah KDF. The cheetah KDF derives an auto-key quantum key and an auto-key initialization vector. The cheetah KDF further implements each of the coeval counter-block periods CCK, which are integral subdivisions of each AQP. Each CCK implements encryption and/or decryption of blocks and implements a counter to advance each block ID.

Figure 6:
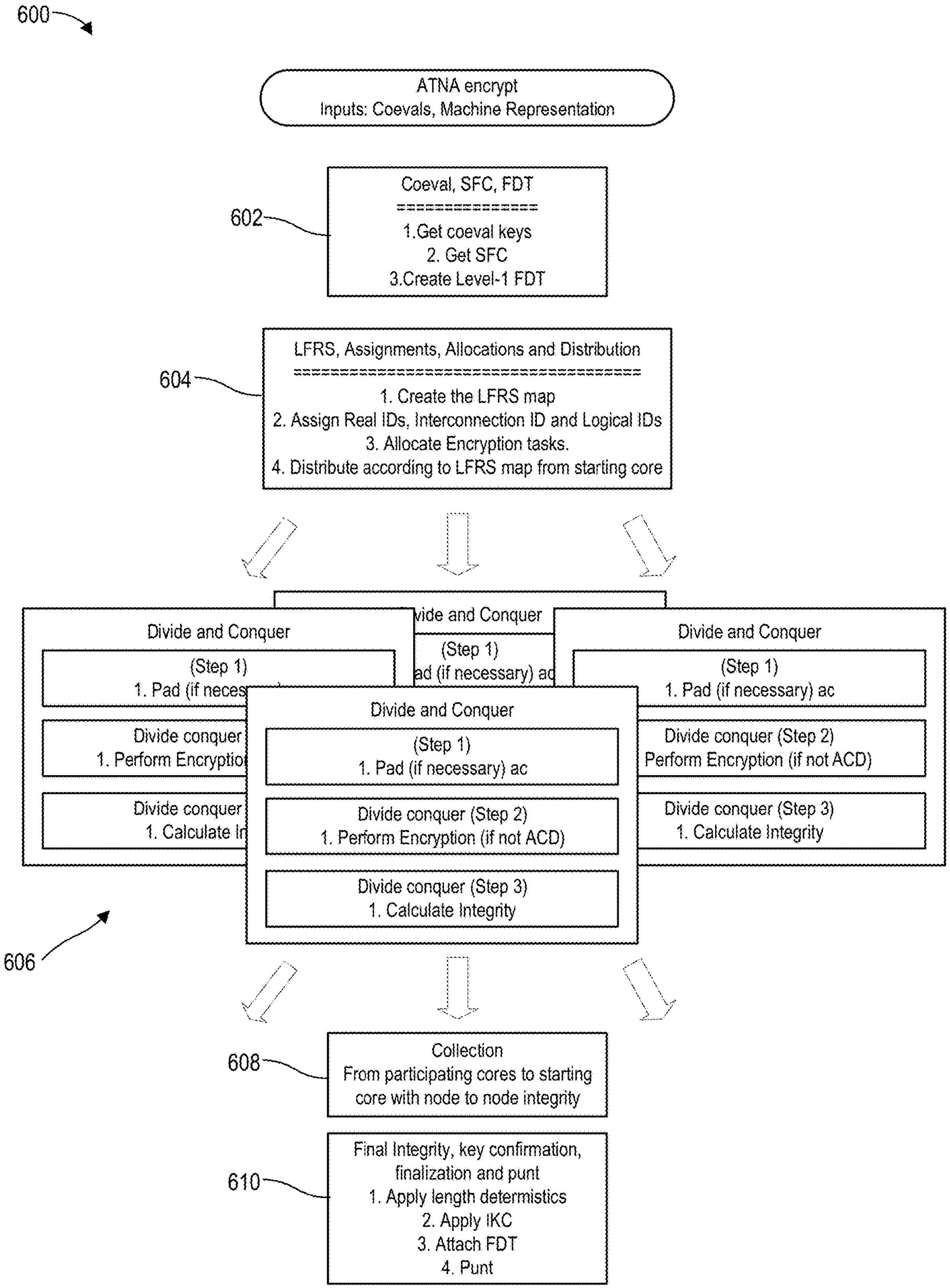
FIG. 6 is a schematic diagram illustrating an embodiment for distributing encryption among multiple machines.

Referring to FIG. 6, FIG. 6 is a schematic diagram 600 illustrating an embodiment for distributing encryption among multiple machines. In various embodiments, the ATNA cipher may be configured to encrypt a dataset using multiple hardware machines or processing cores. In an exemplary embodiment, a high-level multi-processing encryption begins by performing the following tasks 602: 1. Get coeval keys; 2. Get Spirogyra Forwarding Counter (SFC); 3. Create level-1 Fast Drop Tag (FDT).

The ability to encrypt and decrypt in parallel allows the ATNA cipher to quickly complete large data sets. To do this, the ATNA cipher generates predetermined allocations to a set of physical core IDs. A physical core ID, as used herein, may refer to a physical processor coupled to a memory.

Once the tasks 602 are completed, physical cores may be allocated. The ATNA cipher uses a system referred to as logical forwarding route system (LFRS) 604 to abstract a topology into a set of logical IDs across the topology. The logical forward route system begins by creating an LFRS map. The LFRS map lists IDs for hardware/physical cores that may perform an encryption task.

After a number of physical cores are known, tasks may be assigned to specific physical core IDs. The organization of physical cores themselves is referred to herein as a topology. The ATNA cipher may support any number of topologies. In an exemplary embodiment, two topologies are approved for use. A hypercube topology allows the simplest 1-bit flip routing system. Currently, the hypercube topology is a preferable interconnect. There is also a crossed cubed topology, which is an adaptation of the hypercube topology that allows for fewer steps in routing.

The topology, as defined by the Logical Forward Routing System (LFRS) map, allows for the sequential distribution and collection of encryption units. Encryption units are sets of data such as blocks to be encrypted. The topology also allows for parallel computation. Encryption units are assigned across a full set of hardware cores. Once encryption units are assigned, the encryption units are distributed to the cores according to the LFRS map. In various embodiments, encryption units are assigned to nodes in a topology based on a banker's algorithm.

The Spirogyra Forwarding Counter (SFC) signs an ID to encryption units, which facilitates allocating the encryption units to multiple cores based on the topology determined by the LFRS map. The Spirogyra Forwarding Counter ID's may be included in an STID field for encryption units. Fast drop tags (FDT) may be created and include the STID and IVCTR which is representative of the coeval state IV and keys derived by the coeval key derivation functions for integrity and ciphering (i.e., encryption and decryption) services.

Once allocations and distributions are set in the LFRS, encryption units may be allocated to one or more cores. The various overlapping boxes 606 indicate encryption units being split and a "divide and conquer" system to process encryption units by multiple cores simultaneously. Each of the cores may determine whether a thread requires padding or alignment in a $1^{st}$ step. In a $2^{nd}$ step the core may perform encryption. And in a $3^{rd}$ step, the core may calculate integrity.

The ATNA cipher includes an integrity tag that is based on a STNMAC standing for STN message authentication code. The STNMAC for every block or packet includes a number based on a number of cores. Encrypted blocks and packets of encryption units may be collected 608 and a reverse distribution route to maintain integrity.

The final integrity 610 exists when an integrity value is fully convolved at the starting node. The AQIV and CCK key confirmations using $IKC_{PKT}$ are applied to each packet. A length is determined for authenticated bits based on an alignment and length field collectively the "align, "acdlen" fields. Integrity key confirmation (IKC) is attached to each packet or block of data. A fast drop tag is also attached to each packet or block of data. The encrypted data is punted after applying length deterministics, applying the IKC, and attaching the fast drop tag.

Figure 7:
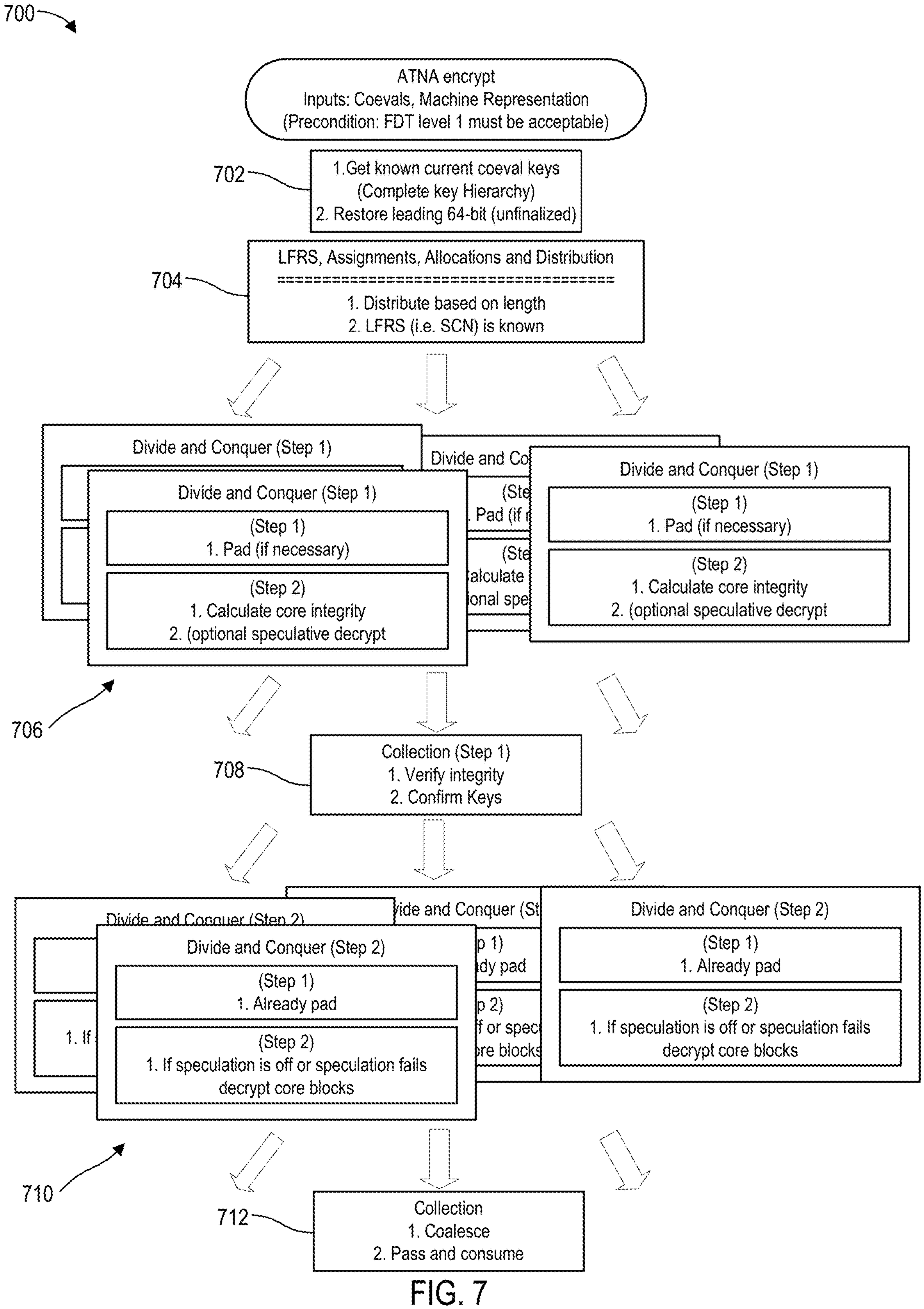
FIG. 7 is a schematic diagram illustrating an embodiment for distributing decryption among multiple machines.

Referring to FIG. 7, FIG. 7 is a schematic diagram 700 illustrating an embodiment for distributing decryption among multiple machines. The tasks of encryption and decryption may be spread among multiple cores. FIG. 6 illustrates an embodiment of allocating an encryption task to multiple machines while FIG. 7 illustrates a parallel decryption task. Just as encryption units are spread among multiple cores to encrypt a dataset, encryption units may be spread among a different set of cores to decrypt a dataset. The ATNA cipher automatically allocates encryption units to cores based on an algorithm such as the banker's algorithm to make the best use of all cores on both the encryption side and decryption side.

At step 702, the system decrypting a dataset may determine current coeval keys. The current coeval keys may be calculated based on a first entity that encrypts a dataset and a second entity that decrypts the dataset. The ATNA cipher supports M to N processing. For instance, a first entity may encrypt a dataset with M number of processors and a second entity may decrypt the dataset with N number of processors. Next, the leading 64-bit of the message is decoded. This is because the leading to 64 bits of the fast drop tag are swapped with the leading 64 bits of the message.

At step 704, the logical forward routing system (LFRS) may distribute encryption based on the number of cores that should be known and the length of the data. Step 706 shows that the decryption task is allocated among multiple cores. Each core pads a data block if the data block is not full. Integrity is determined for each block and for each core. Each core then verifies the integrity of each block and confirms the coeval keys at each block. A block may be dropped if any of these checks fail.

At step 710, speculatory decryption may be performed before the entire message is received because the first 64 bits of the fast drop tag were exchanged with the first 64 bits of the message. At step 712, the ATNA cipher may coalesce the data, past, and consume it.

Figure 8:
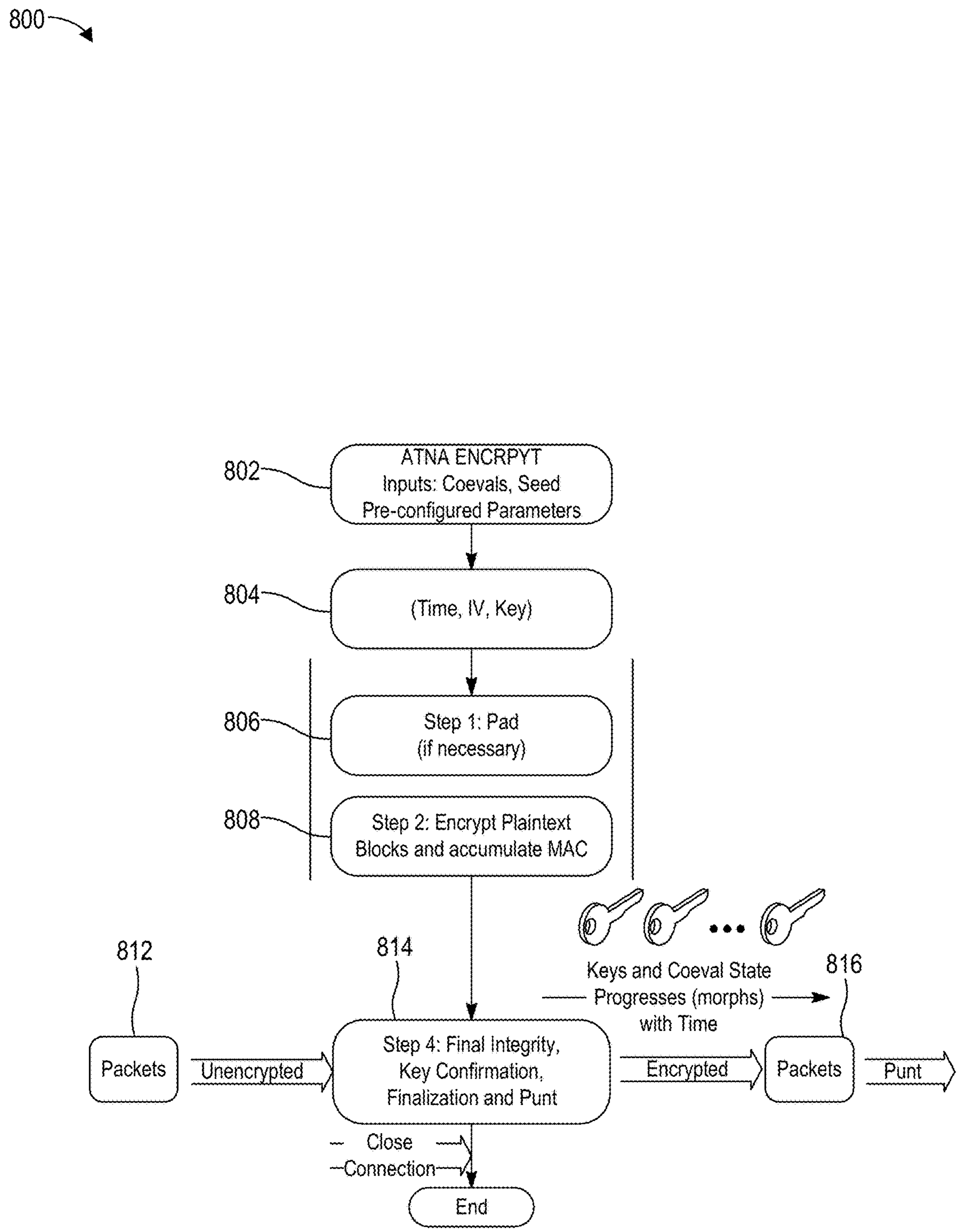
FIG. 8 is a flow diagram for the encryption of data in an embodiment of the ATNA cipher.

Referring to FIG. 8, FIG. 8 is a flow diagram 800 for the encryption of data in an embodiment of the ATNA cipher.

The flow diagram 800 shows an overview of an embodiment of an encryption process. The process begins at step 802 where a first entity and a second entity connect. Both the first entity and second entity exchange an input which may be an initialization time. In an exemplary embodiment, the initialization time may be based on a request time made by the first entity and a response time made by the second entity. The various coeval states may be determined based on the information exchanged by the first entity and the second entity. Further, the seeds for the DRBG algorithm are based on the initial time or other information that is exchanged by the first entity and the second entity. At step 804, the time, initialization vector, and keys are all determined based on the initial time. At step 806, padding is added to data representing the time, initialization vector, and/or keys to makeup and discrepancy in the length of data.

At step 808, plaintext blocks are encrypted and a message authentication code (MAC) is generated. At step 814, the integrity tag that was determined from the initialization time, initialization vector, and determined keys, is appended to an unencrypted dataset. For instance, unencrypted packets 812 may be appended with the calculated integrity tags. the combined packets and integrity tag may then be encrypted at step 816 before being punted to the second entity.

As data is processed, time progresses, and the integrity tag changes as well because it is based on coevals. For instance, the coeval state is limited to a time period and advances to the next state after the previous time period. Accordingly, the ATNA cipher may be protected against timed attacks.

Figure 9A:
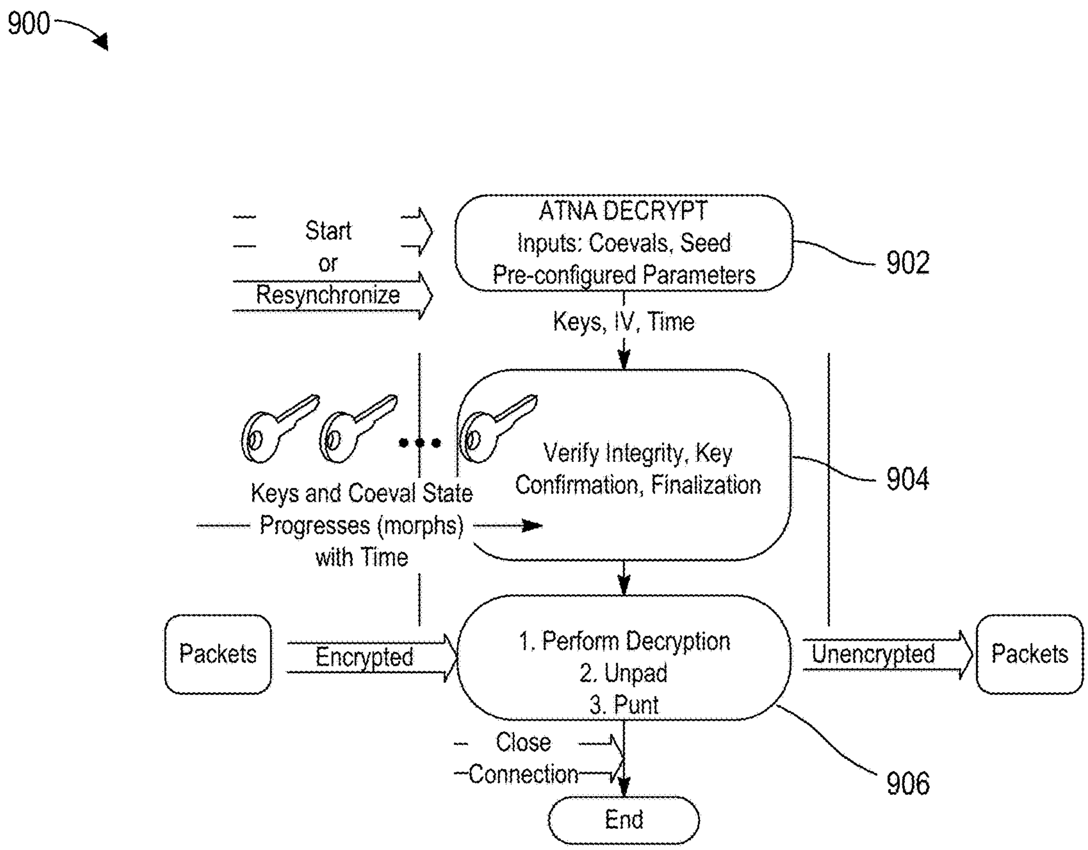
FIG. 9A is a flow diagram for the decryption of data in an embodiment of the ATNA cipher

Referring to FIG. 9A, FIG. 9A is a flow diagram 900 for the decryption of data in an embodiment of the ATNA cipher. Based on the input, which may be an initialization time, a second entity determines the coevals, seeds, and various preconfigured parameters. Thus, at step 902, a second entity accepts a connection with the first entity or resynchronizes a connection with the first entity and uses data exchange and the connection to determine the coeval and DRBG seeds.

At step 904, the second entity may verify an integrity tag from the first entity. The integrity tag may include various keys and coeval states in its calculation. Both the first entity and the second entity calculate integrity tags independent of one another which allows the second entity to verify the integrity of information coming from the first entity. And because coeval states are based on periods, the calculation for the integrity tag will change over time or associative counter max values.

At step 906, one or more cores for the second entity may decrypt encrypted packets coming from the first entity. Once decryption is performed, decrypted data may have padding removed, and decrypted and unpadded data blocks may be saved to be appended to the rest of the dataset.

Figure 9B:
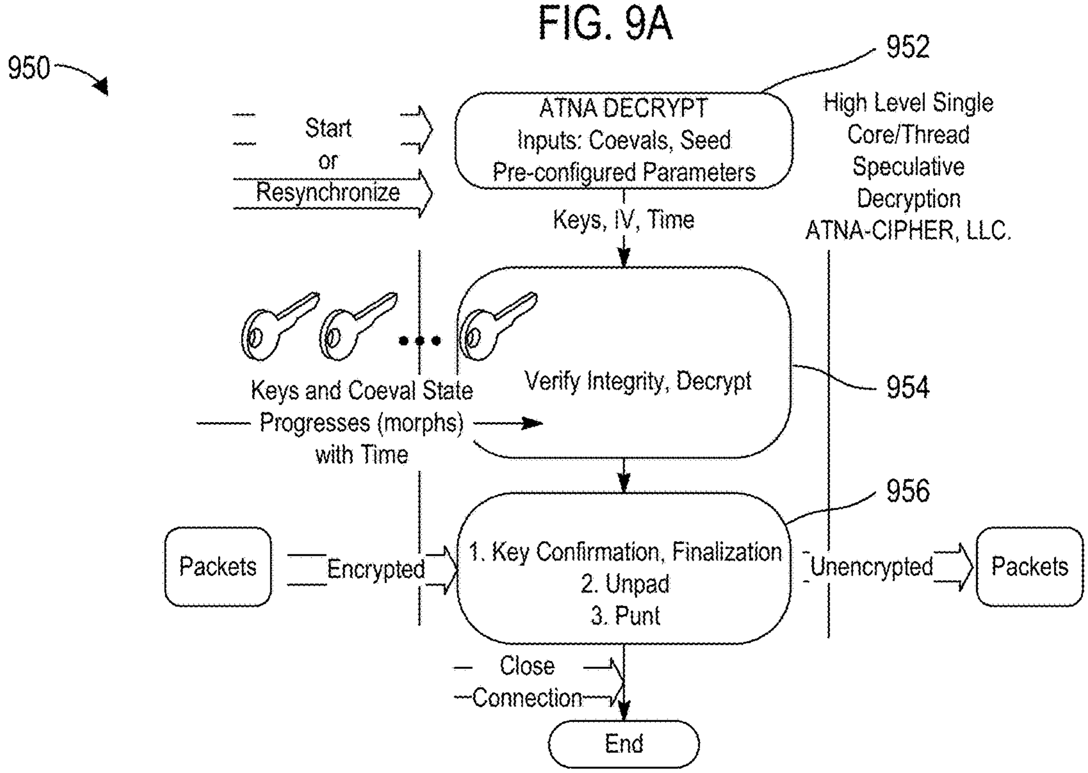
FIG. 9B is another flow diagram for the decryption of data in an embodiment of the ATNA cipher

Referring to FIG. 9B, FIG. 9B is another flow diagram 950 for the decryption of data in an embodiment of the ATNA cipher. The flow diagram 950 illustrates another embodiment of a process by which data may be decrypted and an ANTA cipher. At step 952, which is identical to step 902 above, the ANTA cipher is initialized by a connection in which secret data is exchanged. In an embodiment, the secret data is an initialization time.

At step 954, one or more cores for the second entity verify integrity and decrypt a data packet. At step 956, various coeval keys are confirmed and padding is removed from data blocks. The flow diagram 950 differs from the flow diagram 900 in that decryption is performed before key confirmation. The flow diagram 900 has the advantage of being capable of potentially dropping packets before decrypting them based on key confirmation and integrity.

Figure 10:
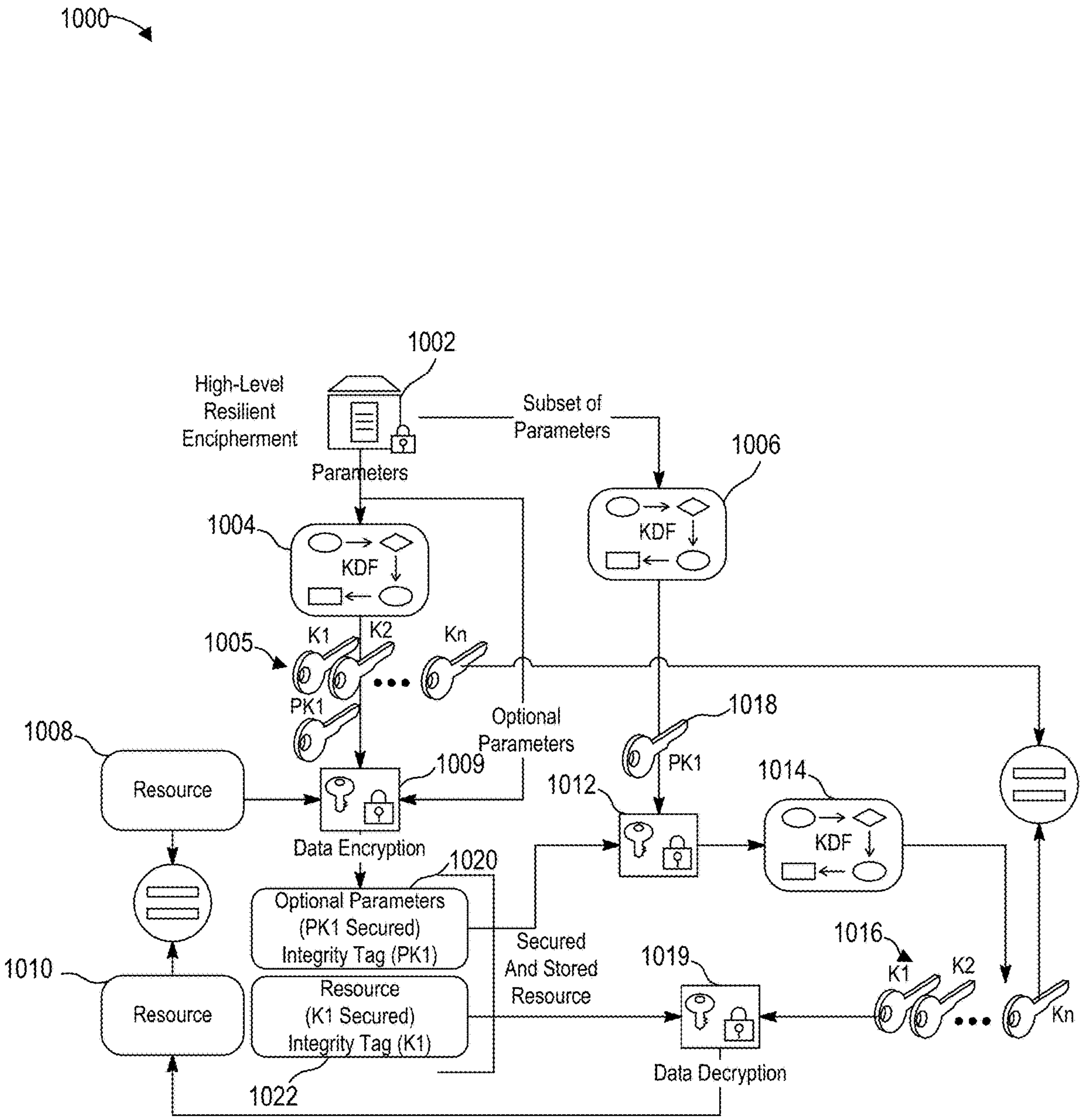
FIG. 10 is a flow diagram for the encryption and decryption of data in an embodiment of the ATNA cipher.

Referring to FIG. 10, FIG. 10 is a flow diagram 1000 for encryption and decryption of data in an embodiment of the ATNA cipher from a high level. At a high level a set of parameters 1002 are used to generate one or more key derivation functions 1004. The one or more key derivation functions 1004 each generate various time periods wherein each time has a corresponding key 1005.

The keys 1005 are used to encrypt data from a data resource 1008 to generate a multitude of data packets 1009. In various embodiments, additional parameters 1020 may be calculated and processed into an integrity tag. The integrity tag may be appended to a dataset and transmitted to the second entity whereby the second entity can verify the data based on the integrity tag.

A subset of the same parameters 1002 is used by the second entity to generate one or more key derivation functions 1006. In various embodiments, the integrity tag is processed 1012 along with the key generated by the key derivation functions 1006 before being passed to one or more key derivation functions 1014 to generate one or more keys and coeval states 1016. The encrypted data may be then processed and decrypted into unencrypted data 1019 which may then be saved and used as a resource 1010 by the second entity.

Figure 11A:
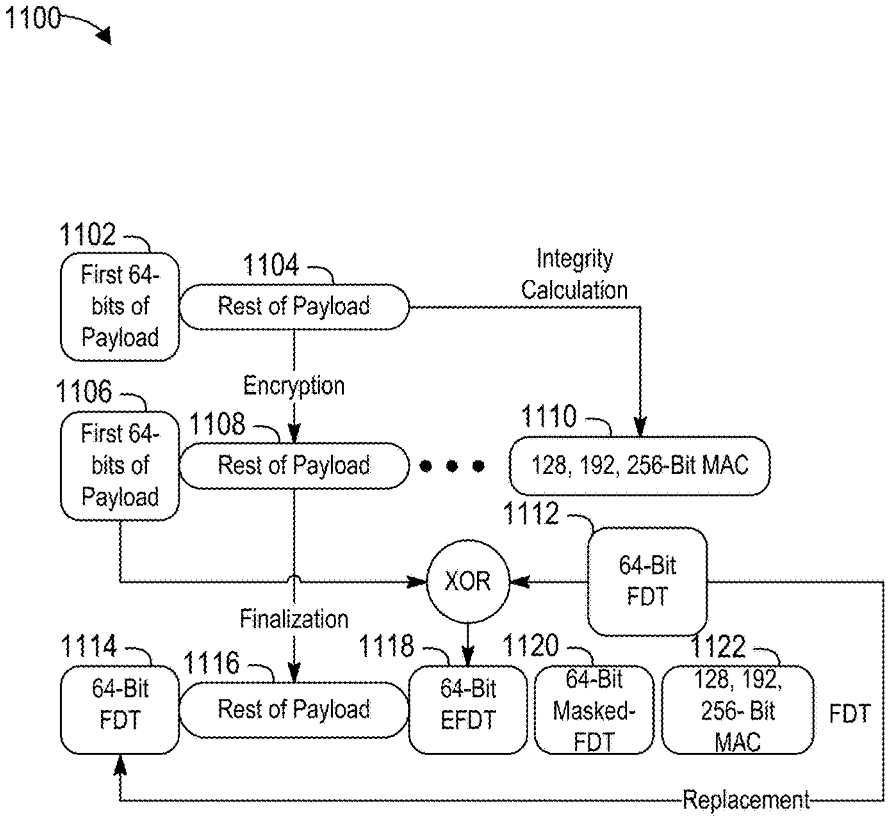
FIG. 11A is a flow diagram for the construction of an integrity tag in an embodiment of the ATNA cipher.

Referring to FIG. 11A, FIG. 11A is a flow diagram 1100 for the construction of an integrity tag in an embodiment of the ATNA cipher. The integrity tag allows a second entity to verify more than just the identity of a sender. It allows the entity to verify various parameters of data as well. The ATNA cipher is configured to transmit a payload from a first entity to a second entity. The payload represented by 1102 and 1104 is used to determine a message authentication code 1110. The first 64 bits of a payload 1102 may be separated from the rest of the payload 1104.

The first 64 bits of the payload 1102 are XOR'd with the first 64 bits of a fast drop tag 1112 and repositioned at the end of the rest of the payload 1116. The first 64 bits of the fast drop tag 1114 are positioned in front of the rest of the payload 1116. The first 64 bits of the payload which were XOR'd with the first 64 bits of the fast drop tag 1112 are positioned at 1118 behind the rest of the payload 1116. Next is the rest of the 64-bit masked fast drop tag 1120 and behind that is the message authentication code 1122 which was generated at 1110.

Figure 11B:
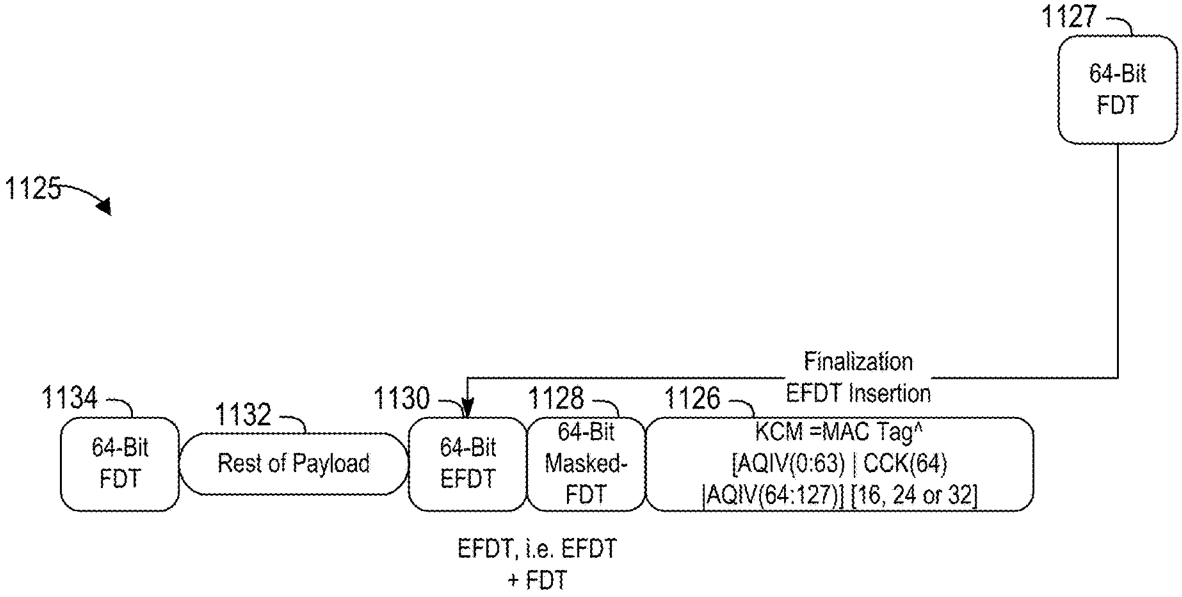
FIG. 11B is another flow diagram for the construction of an integrity tag in an embodiment of the ATNA cipher.

Referring to FIG. 11B, FIG. 11B is another flow diagram 1125 for the construction of an integrity tag in an embodiment of the ATNA cipher. The flow diagram 1125 gives a more concise view of the process for generating an integrity tag. The first 64 bits of the fast drop tag 1134 are positioned at the beginning of the integrity tag followed by the rest of the payload 1132. This is followed by the extended fast drop tag 1130 which is an XOR of the first 64 bits of the fast drop tag 1127 and the first 64 bits of the payload 1102.

Positioned behind the extended fast drop tag 1130 is the rest of the fast drop tag which comprises a 64-bit masked fast drop tag 1128. The message authentication code 1126 is positioned at the end of the integrity tag.

Figure 12:
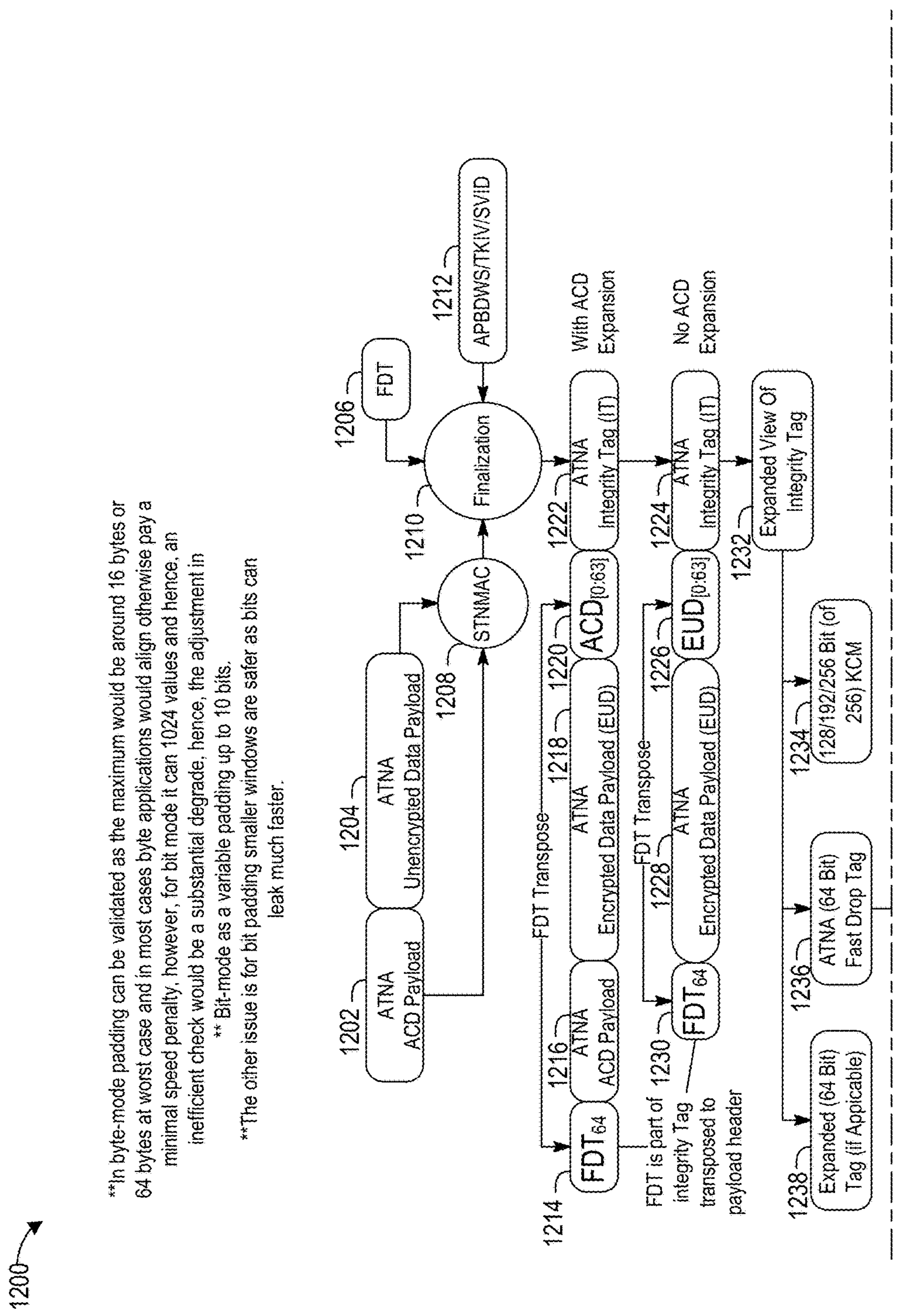
FIG. 12 is a flow diagram for the construction of an integrity tag in an ATNA cipher.

Referring to FIG. 12, FIG. 12 is a flow diagram 1200 for the construction of an integrity tag in an ATNA cipher. Like FIGS. 11A-11B, FIG. 12 shows another embodiment for the construction of an integrity tag, which may be used to verify both the sender and the integrity of data. In flow diagram 1200, the payload, which comprises authenticating data 1202 and a payload 1204, is used to generate the message authentication code 1208. The message of authentication code 1208 is then processed 1210 with the fast drop tag 1206 along with authenticated data padding, the initialization vector, and a service ID 1212 to generate an integrity tag 1210. A fast drop tag 1206 may allow a recipient or a sender to quickly discard a packet based on various levels of drops. A first-level drop is based on the initialization vector counter field which is based on a coeval state. A second-level drop is based on a starting thread ID field and the fast drop tag. A third-level drop is based on a padding bits field in the fast drop tag. These various fields may be added to the fast drop tag at the finalization where the integrity tag 1210 is generated.

The integrity tag 1222 is positioned at the end of a transmission. The first 64 bits of the authenticating data 1202, which may be referred to as the ACD payload, is transposed with the first 64 bits of the fast drop tag 1214. The rest of the authenticating data 1216 is positioned behind the first 64 bits of the fast drop tag 1214. Data blocks that have been encrypted, also referred to as the encrypted data payload 1218, are then positioned next behind the authenticating data payload.

In an exemplary embodiment, the first 64 bits of the authenticating data are XOR'd with the first 64 bits of the fast drop tag end positioned at the end of the encrypted data payload at 1220. The integrity tag 1222 is then placed at the end of the transmission.

An exemplary embodiment with no authenticating data expansion, the last 64 bits of the fast drop tag are then placed at the end of the encrypted data payload 1226. And as mentioned above, the integrity tag 1224 is placed at the end. An expanded view of the integrity tag 1232 shows that it begins with an expanded 64 bit tag 1238 followed by the first 64 bits of the fast drop tag 1236 and then followed by the message authentication code 1234.

Figure 13:
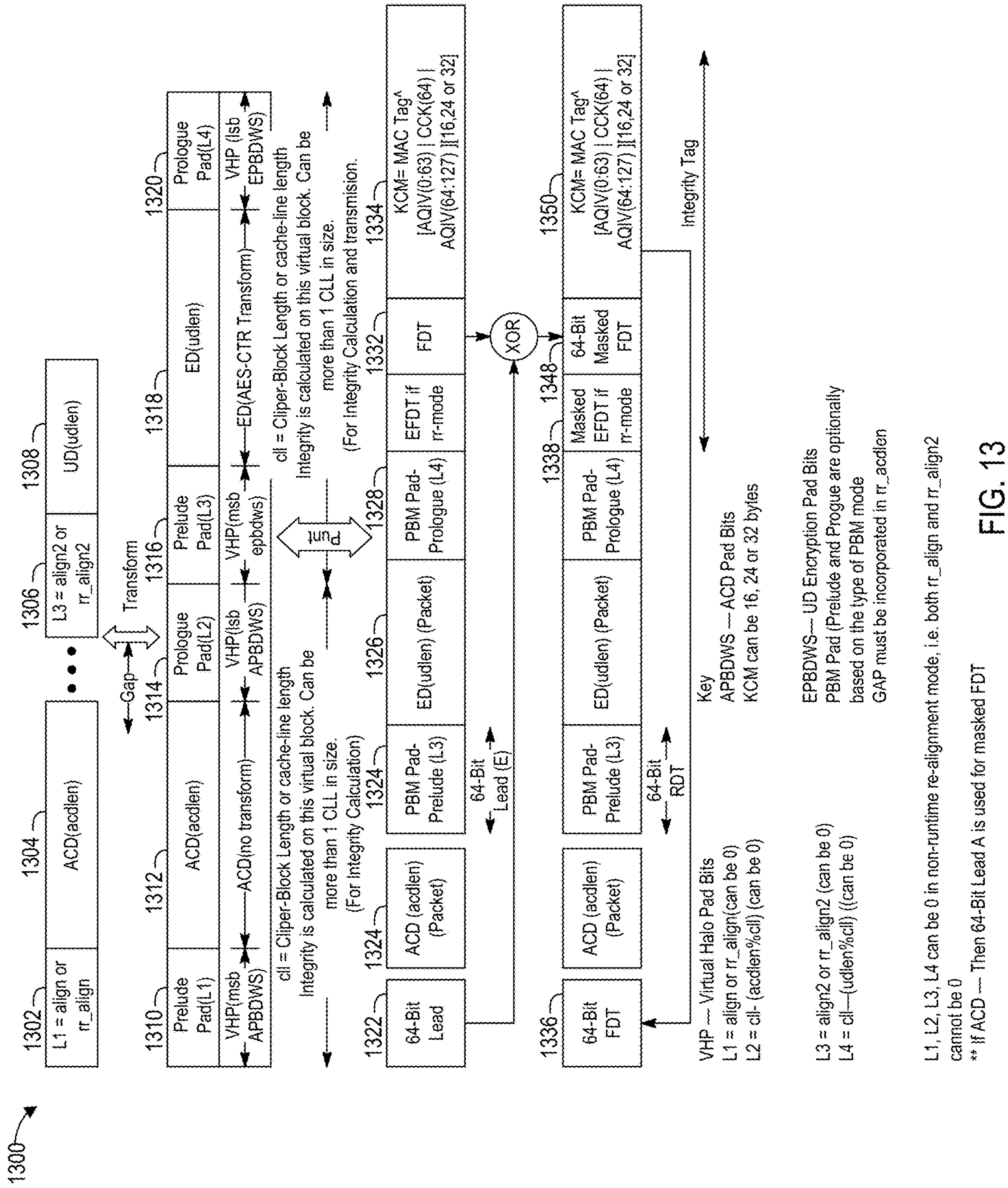
FIG. 13. is a schematic diagram for the implementation of an embodiment of an integrity tag in an ATNA cipher.

Referring to FIG. 13, FIG. 13 is a schematic diagram 1300 for the implementation of an embodiment of an integrity tag in an ATNA cipher. A data set transmission may include authenticating data (ACD) 1304 and unencrypted data (UD) 1308. An alignment field 1302 may be assigned to the authenticating data 1304 based on the length of the authenticating data 1304 to bring it to an integral block size. The alignment field 1302 may then be used to determine the amount of padding to be generated for the authenticating data 1304 block. Similarly, a second alignment field 1306 may be used to determine the amount of padding for unencrypted data 1308.

Looking at the authenticating data 1312, padding is generated on both sides of the authenticating data 1312. A prelude pad 1310 is positioned in front of the authenticating data 1312 and a postamble pad 1314 is placed behind the authenticating data 1312. As the padding is placed both before and after the authenticating data 1312, the padding may be referred to herein as Halo padding. Halo padding may also be generated for the unencrypted data 1308 which is that it may then be processed into encrypted data 1318. Based on the second alignment field 1306 a preamble pad 1316 and a postamble pad 1320 are generated. The Halo padding for the authenticating data 1312 and encrypted data 1318 may align the size of authenticating data 1312 and encrypted data 1318 to an integral size of a block.

The padding bits for the authenticating data may be referred to as ACD padding bits at DRBG windows, or APBDWS. The padding bits for the encrypted data maybe referred to as encryption padding bits at DRBG windows, or EPBDWS. The APBDWS padding bits may also be referred to as virtual Halo padding (VHP) because they may not be transmitted. Similarly, the EPBDWS may also be referred to as virtual Halo padding as it is not necessary that they be transmitted to the second entity. Even though the virtual Halo padding is not transmitted, it may be used for calculating the integrity tag.

When the data set is sent to the second entity, the data may be in the format starting with a 64-bit lead 1322 which corresponds to the first 64 bits of the authenticating data. This is followed by the preamble padding bits 1324 which are then followed by the encrypted data 1326. In the embodiment shown in FIG. 13, the encrypted data is surrounded by the padding bits, preamble padding bits 1324 and postamble padding bits 1328. Following the postamble padding bits 1328, is the extended fast drop tag 1330 followed by the rest of the fast drop tag 1332. The message authentication code is at the end 1334.

The first 64 bits of the authenticating data are XOR'd with the first 64 bits of the fast drop tag 1332 to generate a postamble 64-bit masked fast drop tag 1348. The leading 64-bit fast drop tag is then copied from the message authentication code 1350. The extended fast drop tag 1338 may be considered masked as well because of the postamble 64-bit masked fast drop tag 1348.

Figure 14:
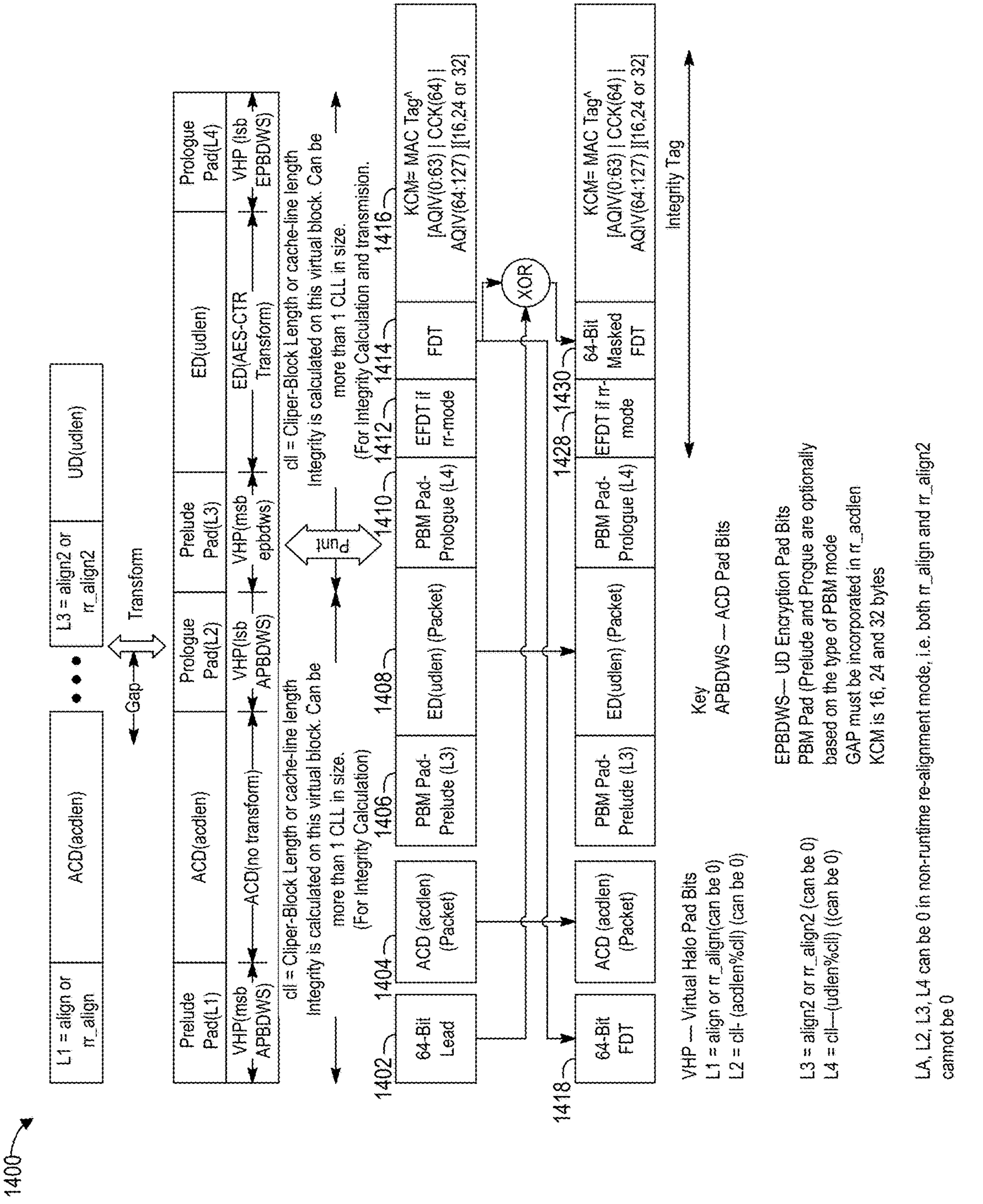
FIG. 14 is another schematic diagram for the implementation of an embodiment of an integrity tag in an ATNA cipher.

Referring to FIG. 14, FIG. 14 is another schematic diagram 1400 for the implementation of an embodiment of an integrity tag in an ATNA cipher. The diagram 1400 shows another embodiment, which is a variation of the embodiment shown in FIG. 13. Here the 64-bit lead 1402 of the authenticating data 1404 is XOR'd with the fast drop tag 1414 to generate the 64-bit masked fast drop tag 1430. The masked fast drop tag 1430 is placed behind the extended fast drop tag 1428. The authenticated data 1404, encrypted data pad preamble 1406, encrypted data 1405, encrypted data pad postamble 1410, extended fast drop tag 1412, and message authentication code 1416 are unchanged.

In various embodiments, the masked fast drop tag 1430 may control ingress and egress compliance via positional bits that our derived from the 64-bit lead 1402. Ingress refers to data that is accepted and egress refers to data that is sent. For instance, the masked fast drop tag may determine whether or not data may be sent by a first entity. Similarly, the masked fast drop tag may determine whether or not data may be accepted by the second entity. These features of the integrity tag add additional versatility beyond simply authenticating a user. For instance, an authenticated user may still be restricted from sending certain data. An example may be confidential data that is held by an entity. The same goes for the receiver of data. Thus, the ingress and egress compliance feature of the fast drop tag may restrict certain data transfers even where both parties are authenticated for a transfer.

The last 64 bits of the fast drop tag 1414 are transferred to the head of the integrity tag at 1418. The positioning of the portion of the fast drop tag 1414 at the beginning of the payload instead of at the end allows for speculative decryption whereby some key assumptions are known at the beginning of decryption. This may allow high-speed decryption to be performed in parallel with integrity.

Figure 15:
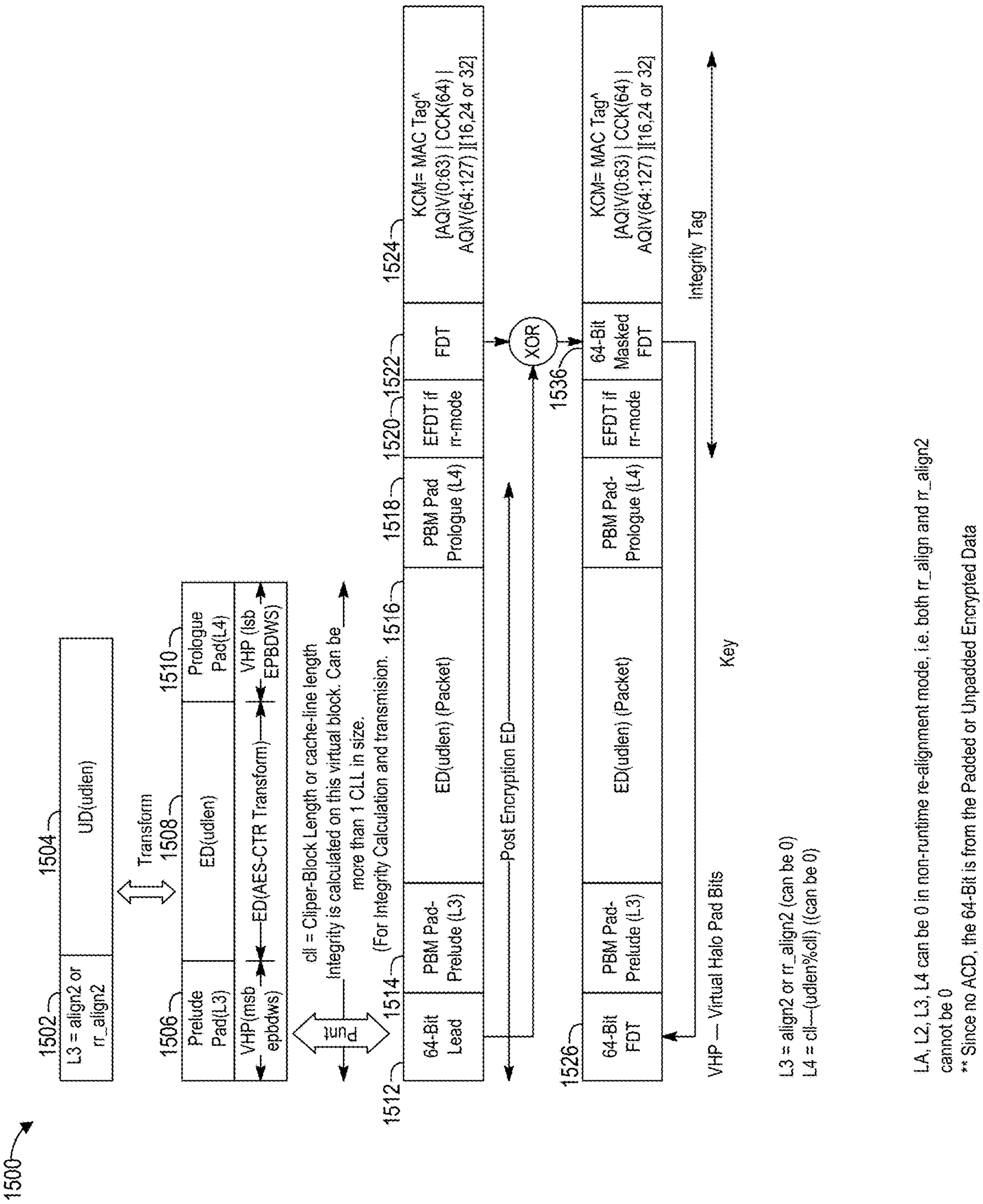
FIG. 15 is another schematic diagram for the implementation of an embodiment of an integrity tag in an ATNA cipher.

Referring to FIG. 15, FIG. 15 is another schematic diagram 1500 for the implementation of an embodiment of an integrity tag in an ATNA cipher without authenticating data. FIG. 15 shows another variation of the embodiment to generate an integrity tag. Other embodiments are shown in FIG. 13 and FIG. 14. As shown in FIG. 15, the unencrypted data 1504 includes an alignment field 1502 that corresponds to the amount of padding required to bring the unencrypted data 2A size that is aligned with an integral block length.

The ATNA cipher encrypts the data to generate encrypted data 1508. It also generates Halo padding comprising a preamble pad 1506 and a postamble pad 1510. The preambled pad 1506 and postamble pad 1510 have lengths based on the alignment field 1502. The leading 16 bits 1512 at the head of the data set undergo an XOR operation with the fast drop tag 1522 to generate a 64-bit masked fast drop tag 1536. The encrypted data preamble pad 1514, encrypted data 1516, encrypted data postamble pad 1518, extended fast drop tag 1520, and message authentication code 1524 are the same as shown in FIG. 14. The 64-bit masked fast drop tag 1536 is then copied to the head 1526 of the integrity tag.

Accordingly, there are many ways to insert the 64-bit fast drop tag at the head of the integrity tag. As shown in FIG. 15, speculative decryption may be performed even when there is no authenticating data.

Figure 16:
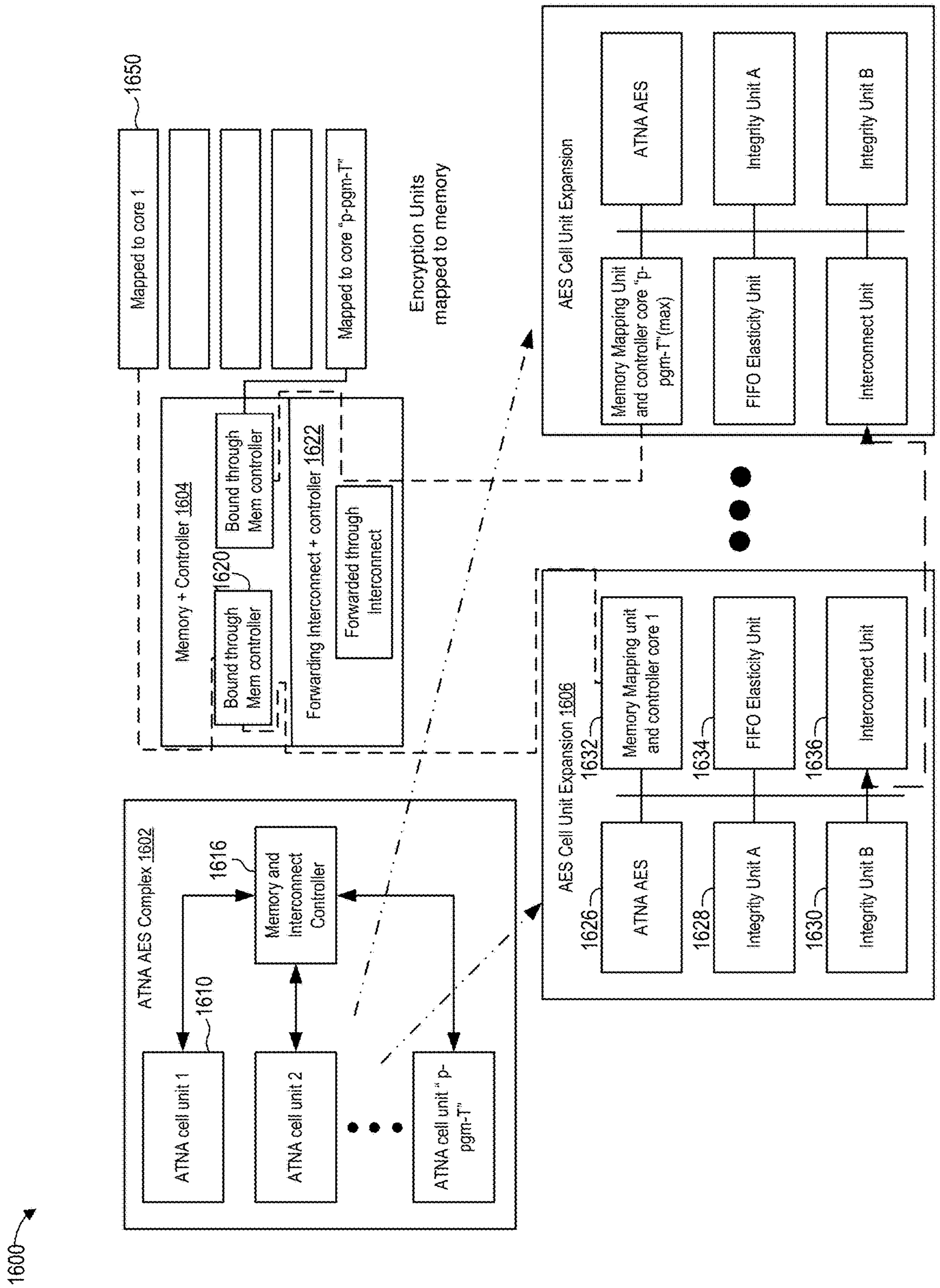
FIG. 16 is a schematic diagram for a hardware configuration to implement an ATNA cipher.

Referring to FIG. 16, FIG. 16 is a schematic diagram 1600 for a hardware configuration to implement an ATNA cipher. Various hardware configurations may be used to implement the disclosed ATNA cipher. An embodiment of a hardware configuration may include an ATNA AES complex 1602 comprising a memory plus controller 1604 and AES cell unit expansion 1606. The AES complex 1602 may be a computer system capable of encrypting and/or decrypting data.

The AES complex 1602 may include one or more ATNA cell units 1610 and a memory and interconnect controller 1616. Each of the one or more ATNA cell units 1610 may comprise a separate computing core processor that is capable of encryption and authentication. The memory and interconnect controller 1616 may be a hub and spoke model responsible for mapping memory to individual cores and coordinating the interconnect integrity flow of the ATNA AES complex 1602.

Each AES cell unit expansion 1606 is an expanded representation of one of the ATNA cell units 1610. In the embodiment shown in FIG. 16, the AES cell unit comprises an AES encryption or decryption unit 1626 to integrity units, a memory mapping unit and controller core 1632, a FIFO elasticity unit, and an interconnect unit 1636. Each encryption or decryption unit 1626 is a separate core that is capable of encryption or decryption.

The integrity unit A 1628 is capable of calculating the integrity for encryption. The integrity unit B 1630 is capable of calculating forwarding integrity. The memory mapping unit and controller core 1632 facilitate communication with the memory and interconnect controller 1616. The FIFO elasticity unit 1634 acts as a buffer to store integrity requests before they are forwarded when the receiving unit is free in the case that an interconnect forwarding stalls.

The memory plus controller 1604 maps memory to individual cores and coordinates interconnect integrity flow. The memory plus controller 1604 may comprise a multitude of bound-through memory controllers 1620 and a forwarding interconnect plus controller 1622. Each of the multitude of bound-through memory controllers 1620 may be mapped to a core 1650 which corresponds to a memory mapping unit and controller core 1632.

Figure 17:
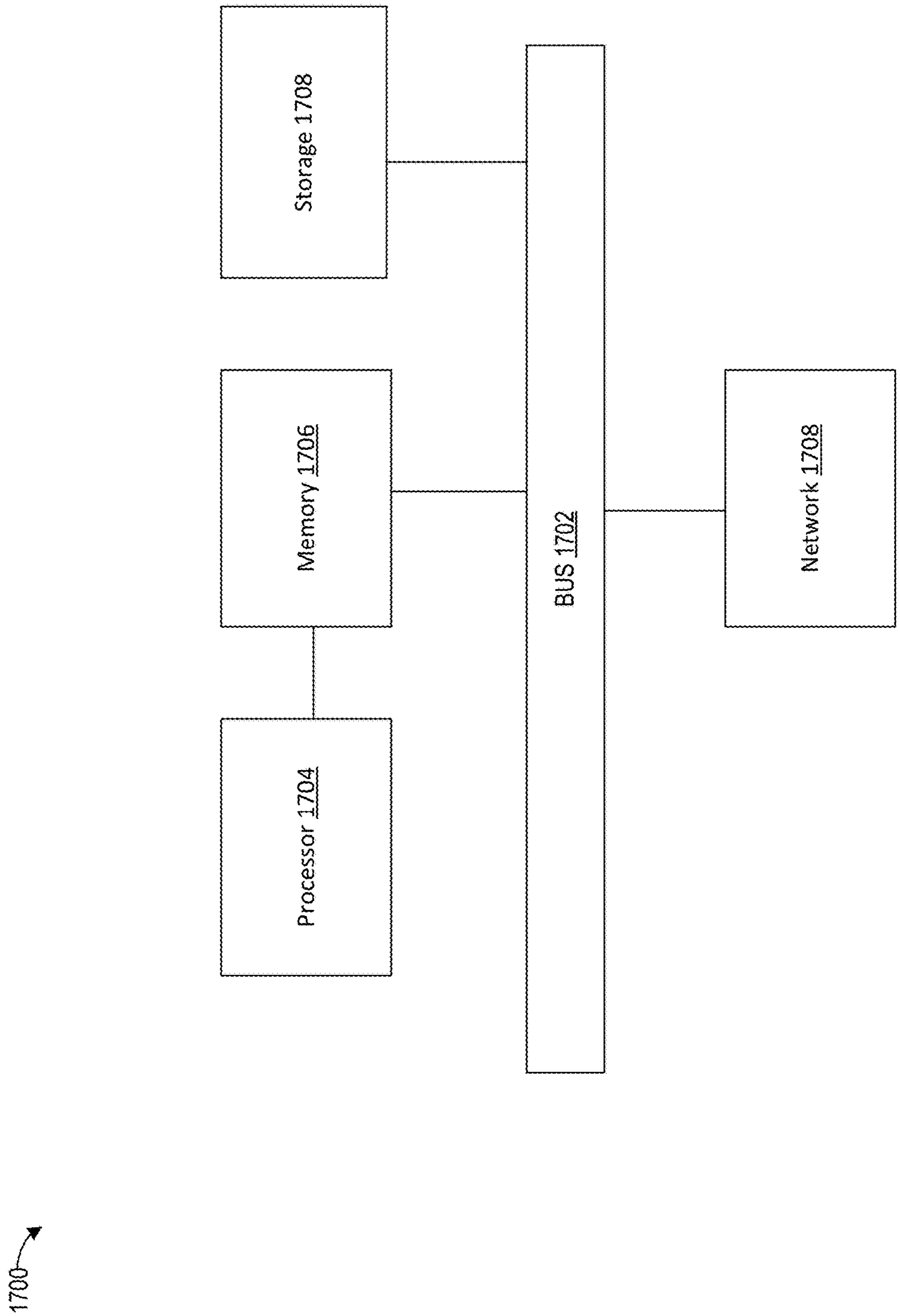
FIG. 17 is a schematic diagram of a computer system that is capable of implementing either encryption or decryption for an ATNA cipher.

Referring to FIG. 17, FIG. 17 is a schematic diagram of a computer system 1700 that is capable of implementing either encryption or decryption for an ATNA cipher. The computer system 1700 may comprise a bus 1702 in communication with a memory 1706 that is coupled to a processor 1704. The bus 1702 may also be in communication with a storage 1708 and a network 1710 with other computer systems. The memory 1706 may direct all data transfer within the computer system 1700. For instance, the memory may direct instructions to be processed by the processor 1704 and then receive processed instructions from the processor to be distributed to one or more parts of the computing system 1700. various types of memory 1706 include but are not limited to random access memory (RAM) and read-only memory (ROM).

The processor 1704 processes instructions that are communicated to it from the memory 1706. Encryption and decryption will be performed by the processor. Currently, the most widely used form of encryption is AES encryption. Most commercial processors are hardwired to perform AES encryption. For instance, most Intel and AMD central processing units (CPU) include hardware that performs AES encryption and decryption. Other types of processors 1704 include graphics processing units (GPU), complex programming logic devices (CPLD), field programmable gate arrays (FPGA), and application-specific integrated circuits (ASIC).

The storage 1708 is configured to hold data for long periods of time. Data that is stored before being sent maybe held in a storage 1708. Data that is received by a second entity from a first entity may be stored in a storage 1708. Various types of storage include but are not limited to spinning hard drives and solid-state drives. The ATNA cipher operates by providing secure data transfer between a first entity and a second entity. This will often be done over a network 1710 a network and may be any electronic connection between the computer system 1700 and another computer system 1700.

Figure 18:
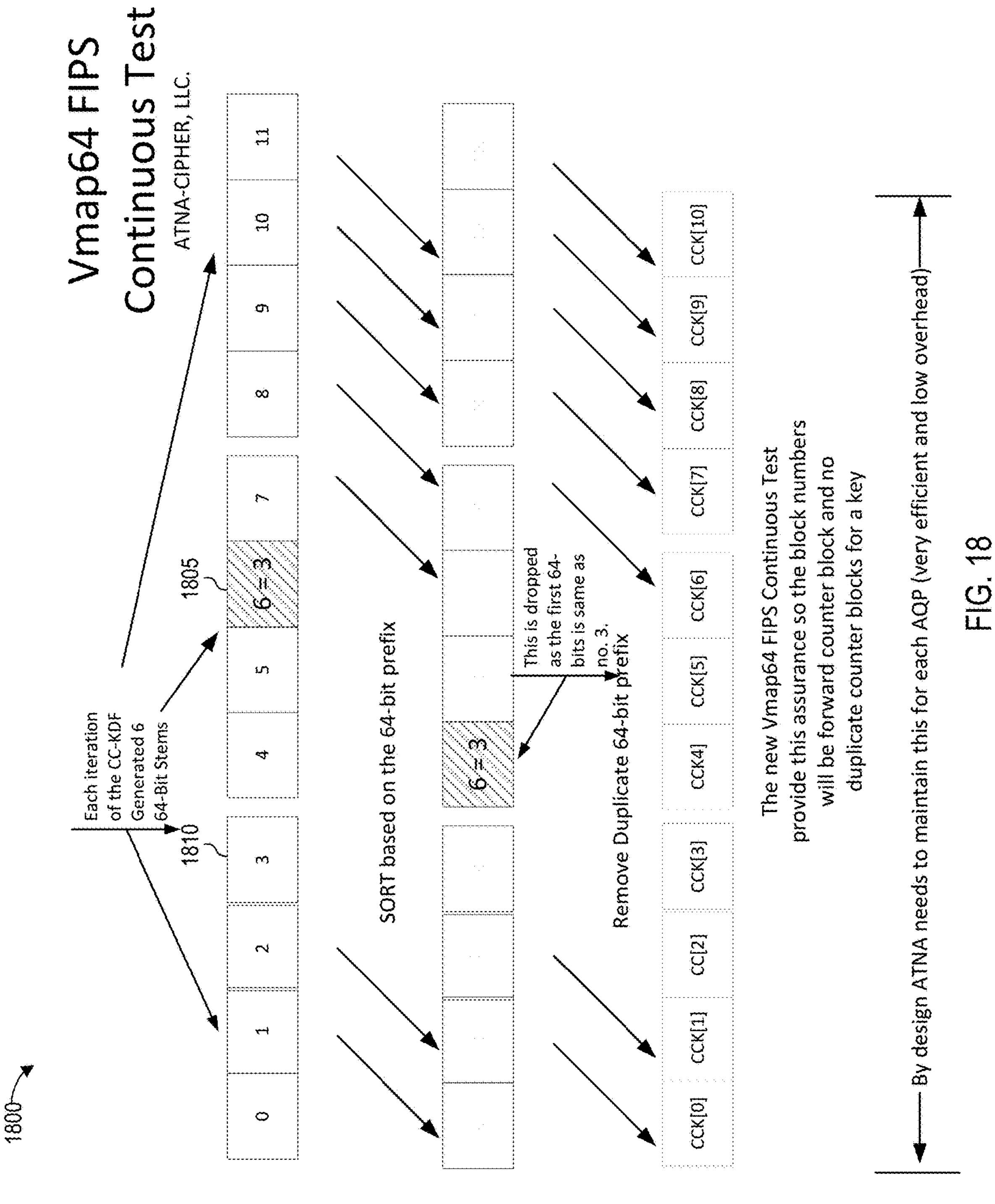
FIG. 18 is an illustration of a continuous test designed into the ATNA Cipher.

Referring to FIG. 18, FIG. 18 is an illustration 1800 of a continuous test designed into the ATNA Cipher. The continuous test, which is referred to herein as vmap64, is run to ensure that each CCK key is not repeated. In various embodiments, vmap64 is FIPS-CC compliant and supports SP800-90B health tests. This assures that a) for a given encryption key, counter block ids are always unique and forward (incrementing with or without gaps); and b) initialization vector (IV) bytes meet the necessary SP800-90B health criteria, which prevents cases where a rogue peer can use weak or repeated IV.

The illustration 1800 is an example of a vmap64 continuous test. As each set of CCK keys is generated, the 64-bit prefixes for each key are sorted. Duplicate CCK keys are dropped based on the sorting. In FIG. 18, the 64-bit prefix of the 6-key 1805 is a duplicate of the 3-key 1810. Accordingly, the 6 key 1805 is dropped and the rest of the keys are shifted to fill in the gap.

Figure 19:
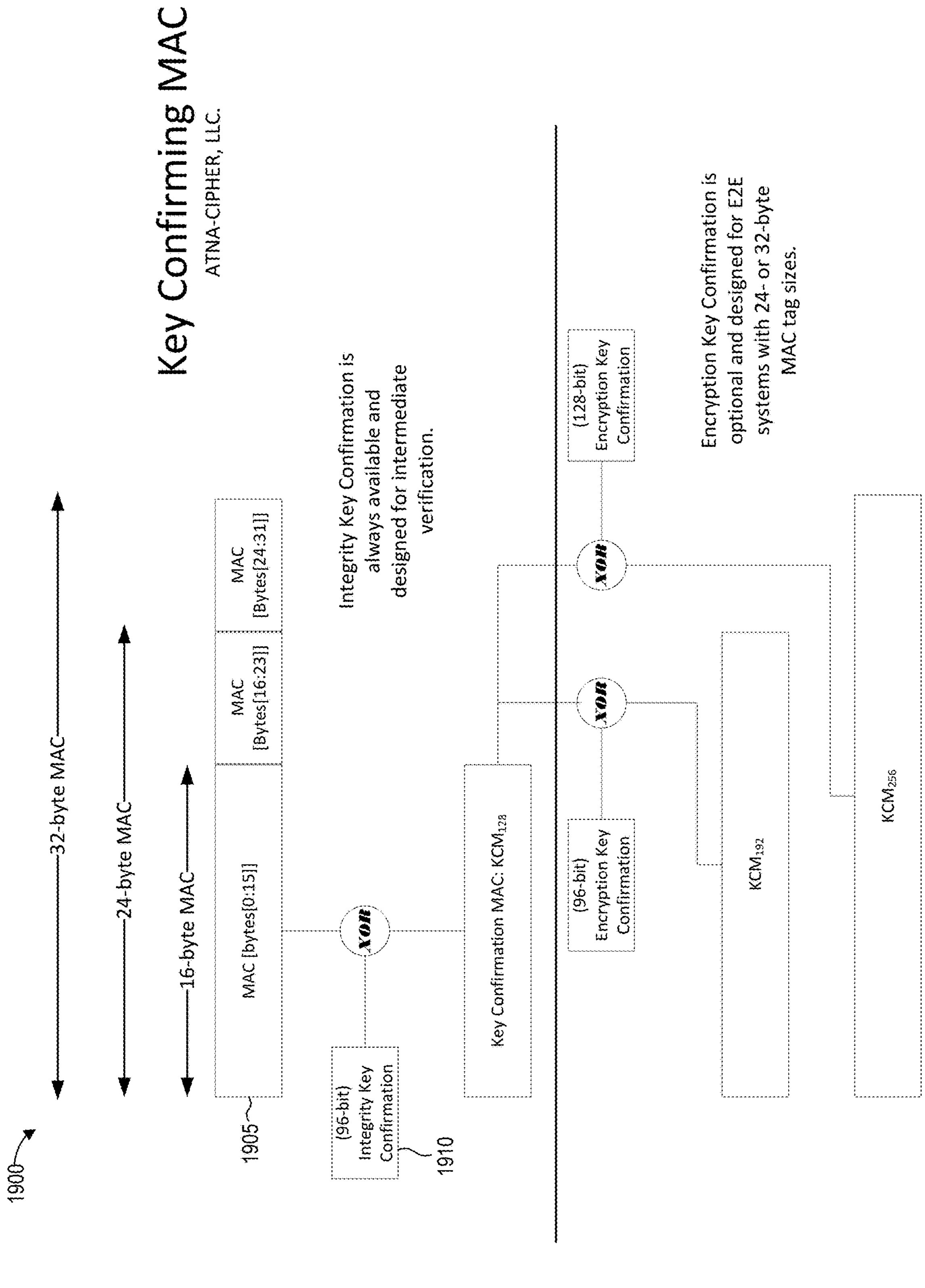
FIG. 19 is a schematic of a key confirming MAC (KCM).

Referring to FIG. 19, FIG. 19 is a schematic 1900 for construction of a key confirming MAC (KCM). The KCM performs two functions, it confirms an integrity key and confirms an encryption key. An embodiment of key confirmation using a KCM embeds secure embodiments over the MAC. This allows receivers to validate i) integrity keys using the integrity key confirmation functionality for tag sizes 128-bit, 192-bit, and 256-bit, and optionally validates ii) the encryption keys using the encryption key confirmation functionality with tag sizes 192-bit and 256-bits.

In the example of a KCM shown in the schematic 1900, a 16-byte 1905 MAC is XOR'd with a 96-bit integrity key 1910 to generate a KCM that confirms the integrity key. If the MAC is longer than 16 bytes, the first 16 bytes 1905 of the MAC are XOR3 d with the 96-bit integrity key 1910. The KCM is then XOR'd with a 96-bit encryption key to confirm the encryption key. In various embodiments, the KCM may be configured to confirm either a 96-bit encryption key or a 128-bit encryption key.

Figure 20:
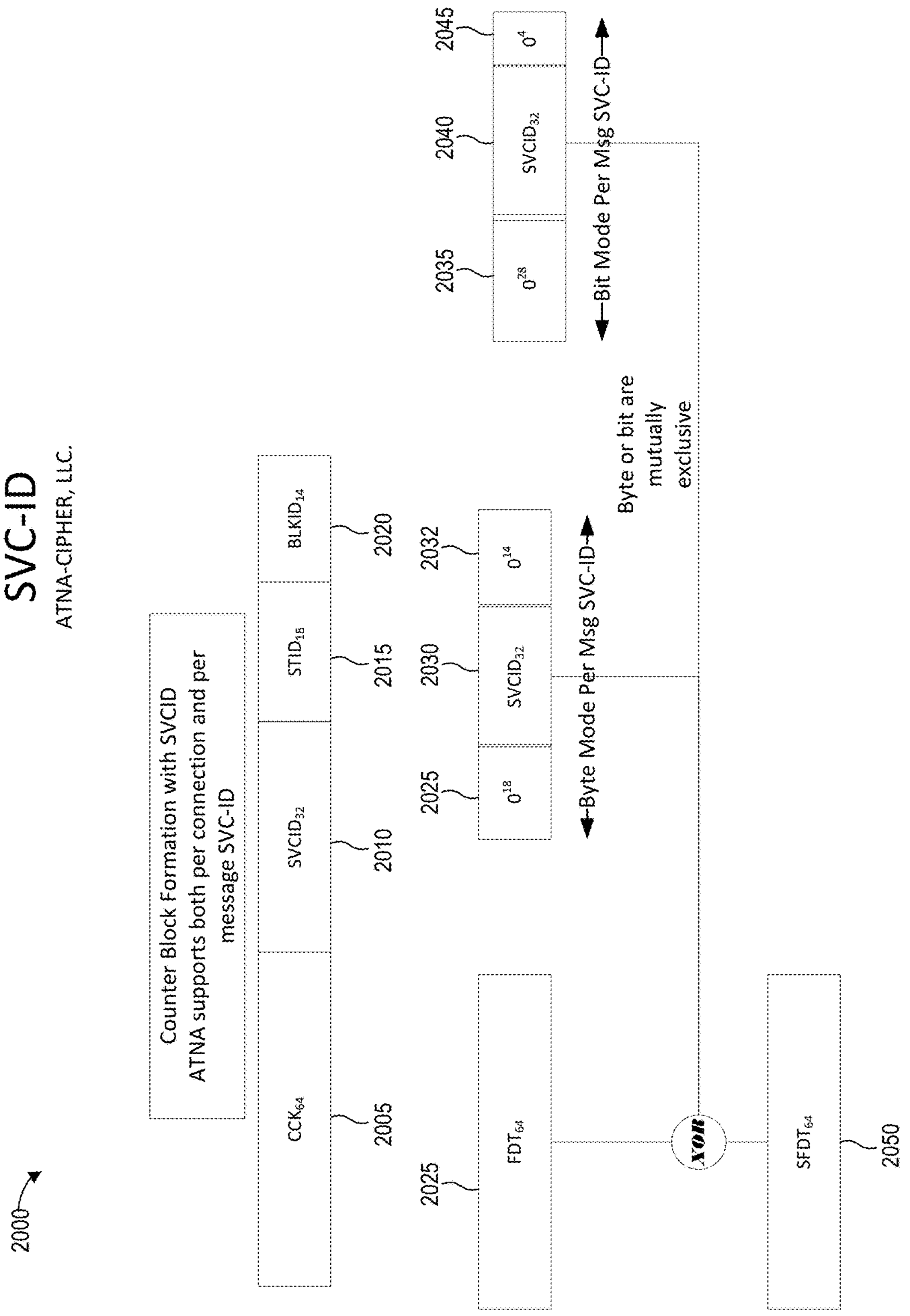
FIG. 20 is a schematic illustrating formation of a counter block with an SVCID.

Referring to FIG. 20, FIG. 20 is schematic 2000 showing service-ID (SVCID) functionality. The SVCID may be a 32-bit peer identifier specific to the connection or per-message allowing identification of group members sharing the connection. The SVCID may be embedded into a counter block for facilitate matching functions to determine if an IVCTR is correct.

A per-message SVC-ID may be configured with tag sizes 128-bits, 192-bits, and 256-bits. In various embodiments, the integrity key confirmation also validates the per-message SVC-ID.

In an exemplary embodiment, each counter block includes a counter block key (CCK) 2005, followed by a SVCID 2010, followed by a STID 2015, and followed by the BLKID 2020. The per-message SVC-ID may be XOR'd with the fast data tag (FDT) 2025 to generate a per-message SVC-ID FDT (SFDT) 2050. The per-message SVC-ID may be constructed differently based on whether it is in a byte mode or a bit mode. In bit mode, the leading 28 bits 2035 comprise the STD and padding. This is followed by the 32-bit SVC-ID 2040. The trailing 4 bits 2045 allow identification of the IVCTR as a single DQP property of SP800-90B.

Bit mode and byte mode are mutually exclusive. In byte mode, the leading 18 bits 2025 comprise the STID and are followed by the 32-bit SVCID 2030. The trailing 14 bits 20323 allow identification of the IVCTR.

Another important innovation is the support of the per connection align, acdlen, align2 which are alignment over the ACD, the length of ACD and alignment over the unencrypted data, whereby, notably this functionality can be used to a) align these to processor cache lines and/or b) integrity and confidentiality offsetting required by some protocols.

Another innovation is the method to support runtime realignments using the Extended FDT (EFDT) that overrides the per connection align, acdlen, align2 with the readjusted ralign, racdlen, ralign2 per message fields.

One more innovation is the support of encryption Partial Bit Modes, namely, a) no padding, b) traditional to the cache line or cipher block length or c) preamble and postamble bit padding to the cache line or cipher block length, namely, align2 bits from EPBDWS in the front and postamble bits from EPBDWS when the encrypted data do not align to the cache-line or cipher block length.

Many variations may be made to the embodiments described herein. All variations are intended to be included within the scope of this disclosure including combinations of variations. The description of the embodiments herein can be practiced in many ways. Any terminology used herein should not be construed as restricting the features or aspects of the disclosed subject matter. The scope should instead be construed in accordance with the appended claims.

The invention claimed is:

1. A method for implementing a block cipher mode between a first entity and a second entity, the method comprising:

generating, by the first entity and the second entity, an initialization vector counter;

generating, by the first entity and the second entity, a key tree based on the initialization vector counter, the key tree comprising:

one or more coeval states, wherein each of the one or more coeval states represents a time period where the time period of each subsequent coeval state is nested within previous coeval states;

a key that is determined for each of the one or more coeval states; and each of the one or more coeval states is determined based on counter max values;

encrypting, by the first entity using the key, one or more blocks of data to be transmitted to the second entity, the second entity is capable of decrypting the one or more blocks only if they are received during the time period of each of the one or more coeval states;

continuously testing keys for each time period of the one or more coeval states by sorting the keys; and dropping, based on the sorting, duplicate keys.

2. The method of claim 1, further comprising, generating, by the first entity, an integrity tag comprising a fast drop tag and a key confirming message authentication code (KCM).

3. The method of claim 2, wherein the fast drop tag comprises data based on each of the coeval states; and wherein the second entity is capable of determining each of the coeval states based on the fast drop tag.

4. The method of claim 3, wherein the second entity comprises more than one core; and wherein the fast drop tag further comprises a core designation that specifies a core to process a block of data.

5. The method of claim 4, wherein the core designation is capable of designating two or more cores to process data from a single packet of the data.

6. The method of claim 2, wherein the integrity tag comprises one or more padding bits that are not transmitted to the second entity.

7. The method of claim 2, wherein the KCM is configured to confirm both an integrity key and an encryption key.

8. The method of claim 2, further comprising generating a per-message service ID that is capable of validating the initialization vector counter.

9. The method of claim 1, wherein the initialization vector counter is determined based on a request time from an initiator and a response time from a responder.

10. A system for implementing a block cipher between a first entity and a second entity, the system comprising:

a processor coupled to a memory for the first entity, the processor configured to generate an initialization vector counter responsive to a connection with the second entity;

the processor further configured to generate a key tree based on the initialization vector counter, the key tree comprising:

one or more coeval states, wherein each of the one or more coeval states represents a time period where the time period of each subsequent coeval state is nested within previous coeval states;

a key that is determined for each of the one or more coeval states; and each of the one or more coeval states is determined based on counter max values;

the processor further configured to encrypt, using the key, one or more blocks of data to be transmitted to the second entity, the second entity is limited to decrypting the one or more blocks only if the one or more blocks are received during the time period of each of the one or more coeval states;

the processor further configured to generate an integrity tag comprising a fast drop tag and a message authentication code, wherein the fast drop tag comprises data based on each of the coeval states, and wherein the second entity is capable of determining each of the coeval states based on the fast drop tag; and wherein the integrity tag comprises a core designation that specifies a core to process a block of data.

11. The system of claim 10, wherein the core designation is capable of designating two or more cores to process data from a single packet of the data.

12. The system of claim 10, wherein the integrity tag comprises one or more padding bits that are not transmitted to the second entity.

13. The system of claim 10, wherein each subsequent timing period state is an integral subdivision of a previous timing period state.

14. The system of claim 10, wherein the initialization vector counter is determined based on a request time from an initiator and a response time from a responder.

15. A non-transitory computer readable storage medium having data stored therein representing a software executable by a processor, the software comprising instructions that, when executed, cause the processor to perform:

generating an initialization vector counter responsive to a connection with an entity;

generating a key tree based on the initialization vector counter, the key tree comprising:

one or more coeval states, wherein each of the one or more coeval states represents a time period where the time period of each subsequent coeval state is nested within previous coeval states;

a key that is determined for each of the one or more coeval states; and each of the one or more coeval states is determined based on counter max values;

encrypting one or more blocks of data to be transmitted to a computer network, the computer network is capable of decrypting the one or more blocks only if they are received during the time period of each of the one or more coeval states;

continuously testing keys for each time period of the one or more coeval states by sorting the keys; and dropping, based on the sorting, duplicate keys.

16. The non-transitory computer readable storage medium of claim 15, wherein a fast drop tag comprises data based on each of the coeval states;

wherein the computer network is capable of determining each of the coeval states based on the fast drop tag; and wherein an integrity tag comprises one or more padding bits that are not transmitted to the entity.

* * * * *